(12) United States Patent
Calleija

(10) Patent No.: US 12,524,013 B2
(45) Date of Patent: Jan. 13, 2026

(54) AUTOMATIC ROBOTICALLY STEERED SENSOR FOR TARGETED HIGH PERFORMANCE PERCEPTION AND VEHICLE CONTROL

(71) Applicant: Aurora Operations, Inc., Pittsburgh, PA (US)

(72) Inventor: Mark Calleija, San Mateo, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/657,324

(22) Filed: May 7, 2024

(65) Prior Publication Data

US 2024/0310838 A1 Sep. 19, 2024

Related U.S. Application Data

(63) Continuation of application No. 18/159,961, filed on Jan. 26, 2023, now Pat. No. 12,007,782, which is a
(Continued)

(51) Int. Cl.
*G05D 1/02* (2020.01)
*G05D 1/00* (2006.01)
(Continued)

(52) U.S. Cl.
CPC .......... *G05D 1/0246* (2013.01); *G05D 1/249* (2024.01); *G06F 18/251* (2023.01);
(Continued)

(58) Field of Classification Search
CPC .... G05D 1/0246; G05D 1/249; G06F 18/251; G06F 18/25; G06T 3/4038; G06T 7/73;
(Continued)

(56) References Cited

U.S. PATENT DOCUMENTS 9,953,210 B1 4/2018 Rozploch et al.
10,274,965 B2 4/2019 Nguyen et al.
(Continued)

FOREIGN PATENT DOCUMENTS

WO WO 2018/106262 6/2018
WO WO 2020/041214 2/2020

OTHER PUBLICATIONS

International Application Serial No. PCT/US2019/047102, International Search Report mailed Dec. 13, 2019, 6 pgs.
(Continued)

*Primary Examiner* — Rodney A Butler
(74) *Attorney, Agent, or Firm* — Dority & Manning, P.A.

(57) ABSTRACT

Disclosed are methods, systems, and non-transitory computer readable media that control an autonomous vehicle via at least two sensors. One aspect includes capturing an image of a scene ahead of the vehicle with a first sensor, identifying an object in the scene at a confidence level based on the image, determining the confidence level of the identifying is below a threshold, in response to the confidence level being below the threshold, directing a second sensor having a field of view smaller than the first sensor to generate a second image including a location of the identified object, further identifying the object in the scene based on the second image, controlling the vehicle based on the further identification of the object.

20 Claims, 12 Drawing Sheets

Related U.S. Application Data continuation of application No. 16/129,277, filed on Sep. 12, 2018, now Pat. No. 11,592,832.

(60) Provisional application No. 62/719,984, filed on Aug. 20, 2018.

(51) Int. Cl.
| | |
|---|---|
| *G05D 1/24* | (2024.01) |
| *G05D 1/249* | (2024.01) |
| *G06F 18/25* | (2023.01) |
| *G06T 3/40* | (2024.01) |
| *G06T 3/4038* | (2024.01) |
| *G06V 10/25* | (2022.01) |
| *G06V 10/80* | (2022.01) |
| *G06V 10/98* | (2022.01) |
| *G06V 20/56* | (2022.01) |
| *G06V 20/58* | (2022.01) |
| *G08G 1/01* | (2006.01) |
| *G08G 1/015* | (2006.01) |
| *G08G 1/04* | (2006.01) |
| *H04N 23/69* | (2023.01) |
| *H04N 23/695* | (2023.01) |
| *G06T 7/73* | (2017.01) |
| *H04N 23/56* | (2023.01) |

(52) U.S. Cl.
CPC ............ *G06T 3/4038* (2013.01); *G06V 10/25* (2022.01); *G06V 10/80* (2022.01); *G06V 10/98* (2022.01); *G06V 20/58* (2022.01); *G06V 20/582* (2022.01); *G06V 20/588* (2022.01); *G08G 1/0112* (2013.01); *G08G 1/015* (2013.01); *G08G 1/04* (2013.01); *H04N 23/695* (2023.01); *G06T 7/73* (2017.01); *G06T 2207/10028* (2013.01); *G06T 2207/20076* (2013.01); *G06T 2207/20221* (2013.01); *G06T 2207/30241* (2013.01); *G06T 2207/30256* (2013.01); *H04N 23/56* (2023.01)

(58) Field of Classification Search
CPC . G06T 2207/10028; G06T 2207/20076; G06T 2207/20221; G06T 2207/30241; G06T 2207/30256; G06V 10/25; G06V 10/80; G06V 10/98; G06V 20/58; G06V 20/582; G06V 20/588; G08G 1/0112; G08G 1/015; G08G 1/04; G08G 1/09623; G08G 1/163; G08G 1/165; G08G 1/166; G08G 1/167; H04N 23/695; H04N 23/56; H04N 7/181; H04N 23/90; H04N 23/951; B60W 2554/402; B60W 2555/60; B60W 2556/20; B60W 2556/25; B60W 60/0011
See application file for complete search history.

(56) References Cited

U.S. PATENT DOCUMENTS

| | | | |
|---|---|---|---|
| 10,891,745 B1* | 1/2021 | Potter | G01S 17/931 |
| 2006/0146377 A1 | 7/2006 | Marshall | |
| 2013/0027218 A1 | 1/2013 | Schwarz et al. | |
| 2014/0267623 A1 | 9/2014 | Bridges et al. | |
| 2016/0219208 A1* | 7/2016 | Horesh | G03B 15/05 |
| 2017/0308989 A1 | 10/2017 | Lee et al. | |
| 2018/0215313 A1* | 8/2018 | Diessner | B60R 1/26 |
| 2019/0012795 A1* | 1/2019 | Dai | G06T 7/292 |
| 2019/0043213 A1* | 2/2019 | Mianzo | G06F 18/2411 |
| 2020/0074166 A1 | 3/2020 | Nathaniel et al. | |
| 2021/0261159 A1 | 8/2021 | Pazhayampallil et al. | |
| 2021/0377483 A1* | 12/2021 | Kim | H04N 17/002 |

OTHER PUBLICATIONS

International Application Serial No. PCT/US2019/047102, Written Opinion mailed Dec. 13, 2019, 6 pgs.
International Application Serial No. PCT/US2019/047102, Invitation to Pay Additional Fees mailed Oct. 17, 2019, 9 pgs.

* cited by examiner

AUTOMATIC ROBOTICALLY STEERED SENSOR FOR TARGETED HIGH PERFORMANCE PERCEPTION AND VEHICLE CONTROL

RELATED APPLICATIONS

The present application is a continuation of U.S. Non-Provisional patent application Ser. No. 18/159,961 filed on Jan. 26, 2023, which is a continuation of U.S. Non-Provisional patent application Ser. No. 16/129,277 filed on Sep. 12, 2018 (issued with U.S. Pat. No. 11,592,832 on Feb. 28, 2023), which claims benefit of U.S. Provisional Patent Application No. 62/719,984 filed on Aug. 20, 2018. Applicant claims priority to and the benefit of each of such applications and incorporates all such applications herein by reference in its entirety.

TECHNICAL FIELD

The present disclosure generally relates to the control of autonomous vehicles, and in particular to providing an increased detection and identification range for information within a scene within a proximity of the vehicle.

BACKGROUND

Control of autonomous vehicles may rely on analysis of images captured by on board sensors. The images may be analyzed to detect objects in the scene. The objects may, in some cases, be predicted to be within a projected path of the vehicle and may therefore cause a control system of the vehicle to change the vehicle's path to avoid a collision between the object and the vehicle. In other cases, the objects may not be within the vehicle path, but may provide information regarding conditions ahead, such as roadway conditions. For example, a sign may indicate that there is an accident ahead. Upon recognizing this condition, the control system may alter one or more control parameters of the vehicle to accommodate the indicated condition. The further ahead this information can be recognized by the vehicle control system, the more efficiency and smoothly the vehicle may be controlled, providing for safe and efficient control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
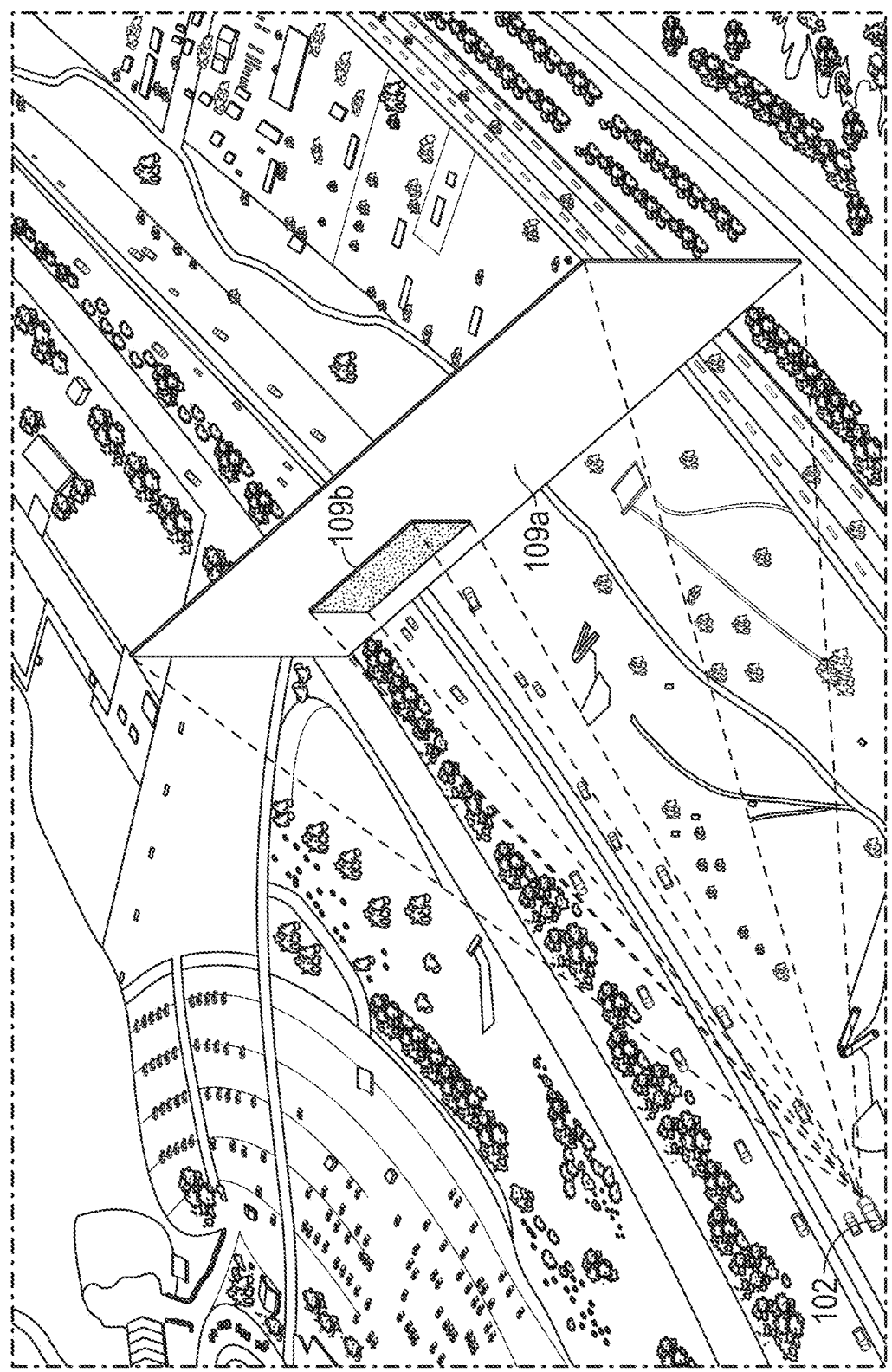
FIG. 1 is an overview diagram of an autonomous vehicle.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, control of moving vehicles may be accomplished by processing of an image of a scene in front of the vehicle as the vehicle moves. The image information may be used to detect characteristics of the scene that may be useful in controlling the vehicle. Objects ahead of the vehicle may be detected for example. In some cases, an object within a path of the vehicle may be detected. The object may not be included in a map being used to control the autonomous vehicle. In some cases, the object may be an obstacle to avoid. When the object is detected in the scene, the vehicle may be controlled to avoid the object, for example, by changing a direction or speed of the vehicle. Depending on a speed of the vehicle and a distance between the vehicle and the detected object when the object is detected, the control inputs may need to be more or less extreme, as necessary to avoid a collision between the detected object and the vehicle, while also taking account of other objects that may be within a proximity of the vehicle and/or its route of travel.

Other information may also be obtained from the image information. For example, a sign may not be within the vehicle path but may indicate road conditions that may be useful in controlling the vehicle. For example, a sign may indicate there is ice on a road used by the vehicle. Modifications to control parameters may be made to compensate for reduced traction and/or skid resistance in response to recognition of the sign. Another sign may indicate the vehicle should change lanes or merge with other traffic. This sign may also provide valuable input to control algorithms of the vehicle.

These objects that effect how a vehicle is controlled may be detected at a variety of distances from the vehicle, depending, for example, how large or unique the object is, whether the object is moving, weather conditions. The time available to respond to the object may vary based on the detection distance, as well as the speed of the vehicle itself. The more time available between a detection of an object or other information relating to conditions of the vehicle environment, the more efficiently control algorithms may apply the information. Thus, it is desirable to detect objects or information as far as economically practical from the vehicle to provide for smooth and efficient vehicle control.

When a vehicle captures images using a camera, the camera may capture a scene that is a first distance in front of the vehicle. As an object's distance from the vehicle increases, the resolution of the object within the scene may decrease, even when the object is represented by the scene. This reduced resolution of the object may prevent an accurate recognition of the object, at least until the distance between the vehicle and the object closes to within a threshold distance.

To solve this technical problem, the disclosed embodiments provide a technical solution that utilizes multiple imaging or ranging sensors to capture information at different resolutions within a scene in front of a vehicle. An example of an imaging sensor may be an optical sensor configured to capture images using optical wavelengths of light or infrared wavelengths of light. A LIDAR sensor is an example of a ranging sensor.

A first sensor or group of sensors has a relatively wider field of view and may thus capture the scene at a particular resolution. An image captured by the first imaging sensor may be analyzed by an analysis engine and one or more objects detected. In some cases, the resolution of a particular object in an image may result in a reduced confidence in a recognition of that object. For example, a street sign may be captured in the scene, but the analysis engine may be unable to recognize the sign given the resolution available from the first imaging sensor and the distance of the sign from the sensor. For example, a text recognition algorithm may be unable to recognize text within the sign given the resolution of the sign in the first image. In this case, the disclosed embodiments may direct a second sensor having a narrower field of view to image the street sign. This may provide a higher resolution image of the street sign and allow the analysis engine to increase a confidence level of the sign's identification. For example, an implementation using a trained model to recognize street signs may experience improved performance when a higher resolution image is provided to the model than when a relatively lower resolution image is provided to the model.

FIG. 1 is an overview diagram showing an autonomous driving vehicle 102 on a highway. The vehicle 102 is capturing a first image of a first scene 109a via a first sensor (not shown). In some aspects, the first sensor may be an imaging sensor. In some other aspects, the first sensor may be a ranging sensor.

The vehicle 102 is also capturing a second image of a second scene 109b via a second sensor (also not shown). A resolution of the first image of the first scene 109a may be lower than a resolution of the second image representing the second scene 109b. As discussed above, some of the disclosed embodiments may provide for the second sensor to be moved relative to the vehicle 102, so as to selectively image a portion of the scene 109a via a higher resolution image. In some aspects, the second sensor may be configured to have a steerable range such that the field of view of the second sensor may include any portion of the field of view of the first sensor. In other words, any object captured in the field of view of the first sensor may also be imaged by the second sensor, in at least some embodiments.

Figure 2:
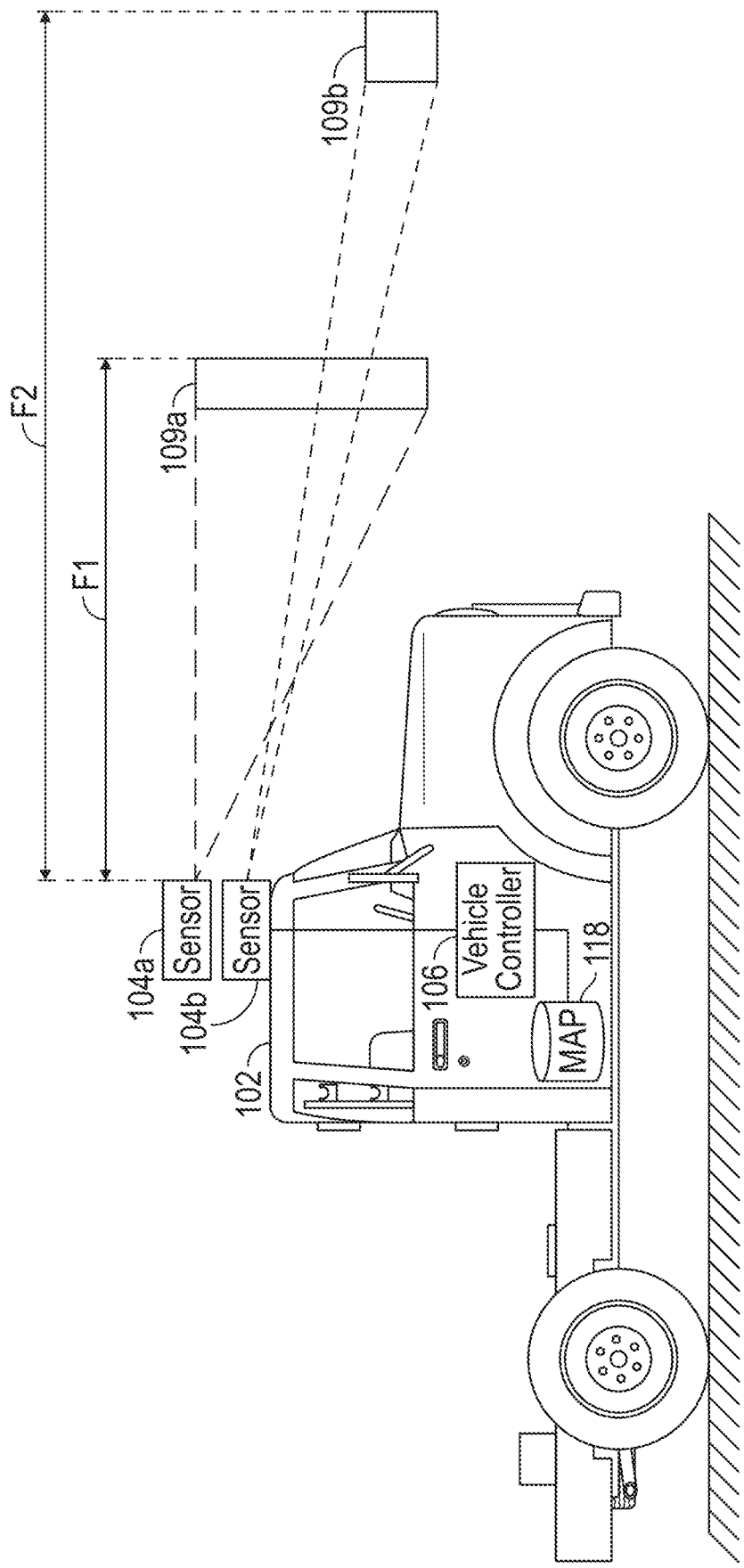
FIG. 2 shows an example embodiment of an autonomous vehicle which may be controlled by one or more of the embodiments disclosed herein.

FIG. 2 is a diagram of the autonomous driving vehicle 102. The vehicle 102 includes a sensor 104a, a second sensor 104b, a controller or vehicle controller 106, and a map database 118. The sensor 104a captures the scene 109a ahead of the vehicle 102. The sensor 104a may be configured with a first field of view and with a first focal distance F1. Thus, information captured by the scene 109a is based on this first field of view and focal distance. An image of the scene 109a may also be captured with a first resolution over the scene 109a. For example, each pixel of a first image captured by the imaging sensor 104a may represent a certain area of the scene, for example, 10 centimeters (cm).

In some aspects, one or more additional sensors may be used to capture additional images, and these one or more additional images may be fused with the first image before the first image is analyzed for objects, as described below. In some aspects, the first sensor described throughout this disclosure may include multiple physical sensors, which may be integrated or separate sensors. Data from the multiple sensors may be fused to capture the first image, for example, as discussed above.

The second sensor 104b may capture the second scene 109b. The second sensor 104b may have a narrower field of view and longer focal distance F2 than the first sensor 104a. In some other embodiments, the first and second sensors 104a-b may have the same focal distance or focal plane. In some embodiments, at least partly because of the narrower field of view of the second sensor 104b, and/or a different focus plane relative to the image 109a captured by the sensor 104a, the second scene 109b may be captured with a second resolution that is higher than the first resolution of the sensor 104a. In some aspects, the second sensor 104b may have a different density of pixels, such that at least a portion of the higher resolution of the second scene 109b compared to the first scene 109a is derived from a higher resolution sensor included in the sensor 104b when compared to the sensor 104a in these particular embodiments.

In some embodiments, the second sensor 104b may be configured with a positioning apparatus such that an orientation of the second sensor 104b with respect to the vehicle 102 may be modified. For example, the second sensor 104b may be configured to vary in one or more of yaw (slew), pitch and/or roll with respect to the vehicle 102. For example, in various embodiments, the second sensor 104b may be configured with a gimbal, pan/tilt apparatus using servo motors pneumatics, or other motive technology. In some aspects, the sensor 104b may not be configured to move, but instead an imaging path of the second sensor 104b may be steerable. The imaging path may be steered via a combination of one or more of lenses, and/or mirrors. In some aspects, a phased array may be used to steer an imaging sensor using electronic means for capturing an image (such as Radar).

By changing the orientation of the second sensor 104b with respect to the vehicle 102, the sensor 104b may be positioned to capture a particular region of interest within the scene 109a. As described in more detail below, the second sensor 104b may image an object identified in the scene 109a, where the identification could benefit from a higher resolution image of a region of interest that includes the identified object. Thus, the second sensor 104b may be positioned to capture a second image that includes the region of interest (e.g. 109b), and the identification of the object improved based on an analysis of the second image. In some aspects, the second sensor 104b may be configured with an ability to adjust a zoom level of a scene captured by the sensor. In some aspects, the zoom may be adjusted to appropriately frame an object being imaged. For example, the zoom may be adjusted such that the object fills a predefined percentage of a scene captured by the imaging sensor (e.g. 60% of the pixels of an image representing a scene are classified as object pixels). In some aspects, a width and/or height of an object may be estimated. The zoom may then be adjusted based on the width and/or height.

Figure 3:
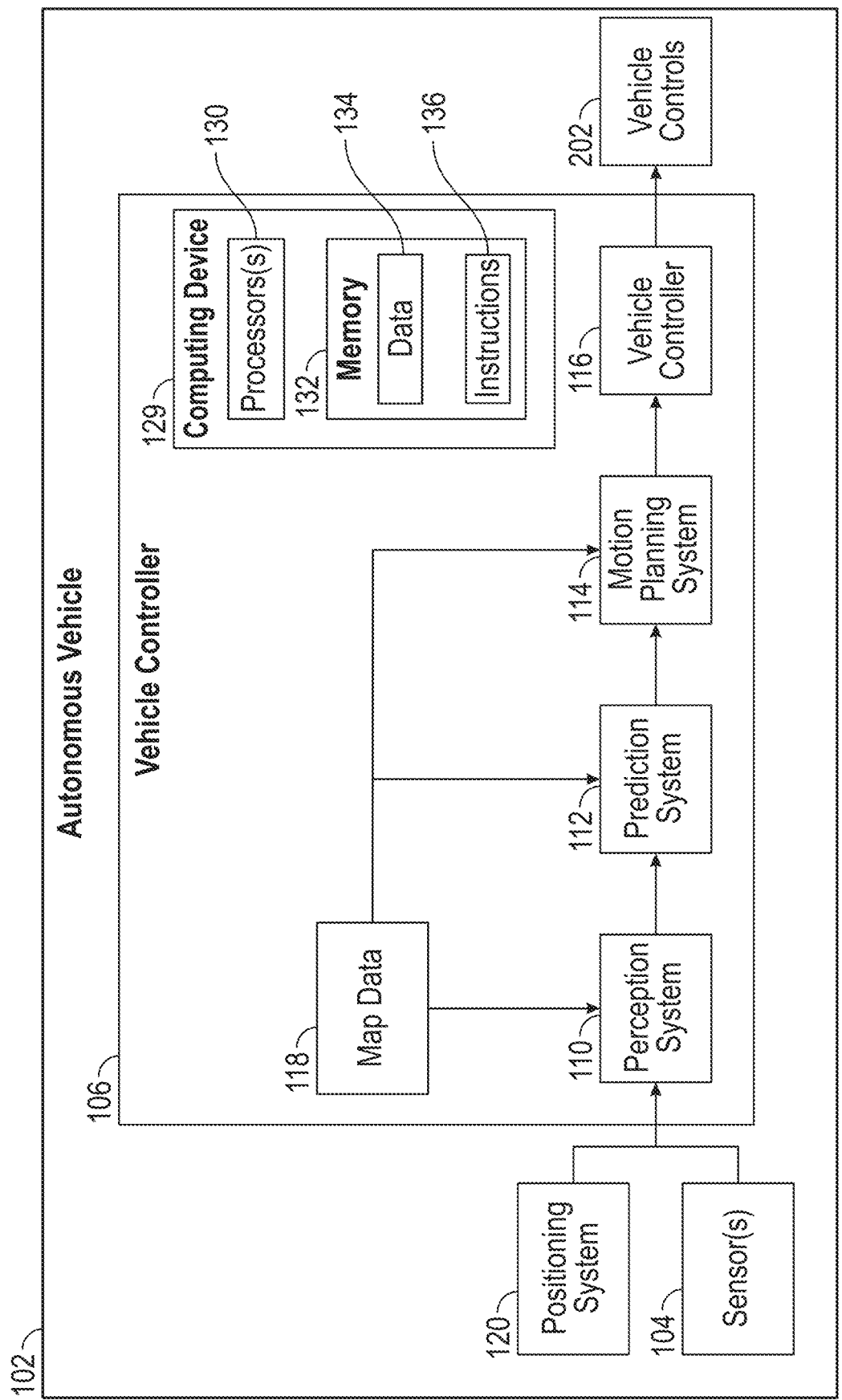
FIG. 3 is an expanded view of an example controller or vehicle computing system.

FIG. 3 is an example block diagram of the vehicle 102 and components used to control the navigation of a vehicle 102 according to example embodiments of the present disclosure. While FIG. 3 shows one example of components within the vehicle 102, which specific components are included in the vehicle 102 and their particular functions may vary by embodiment.

The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

As discussed above, the autonomous vehicle 102 can include one or more sensors 104, a vehicle controller 106, and one or more vehicle controls 202. The vehicle controls 202 may include one or more of the vehicle controller 106 can assist in controlling the autonomous vehicle 102. In particular, the vehicle controller 106 can receive sensor data from the one or more sensors 104, attempt to comprehend the surrounding environment by performing various processing techniques on data collected by the sensors 104, and generate an appropriate motion path through such surrounding environment. The vehicle controller 106 can control the one or more vehicle controls 202 to operate the autonomous vehicle 102 according to the motion path.

The vehicle controller 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle controller 106 to perform operations. In some implementations, the one or more processors 130 and at least one memory 132 may be comprised in one or more computing devices, such as computing device(s) 129, within the vehicle controller 106.

In some implementations, vehicle controller 106 can further be connected to, or include, a positioning system 120. Positioning system 120 can determine a current geographic location of the autonomous vehicle 102. The positioning system 120 can be any device or circuitry for analyzing the position of the autonomous vehicle 102. For example, the positioning system 120 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 102 can be used by various systems of the vehicle controller 106.

As illustrated in FIG. 3, in some embodiments, the vehicle controller 106 can include a perception system 110, a prediction system 112, and a motion planning system 114 that cooperate to perceive the surrounding environment of the autonomous vehicle 102 and determine a motion plan to control the motion of the autonomous vehicle 102 accordingly. In some implementations, the vehicle controller 106 can also include a feature extractor/concatenator 122 and a speed limit context awareness machine-learned model 124 that can be provide data to assist in determining the motion plan to control the motion of the autonomous vehicle 102.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, multispectral or hyperspectral cameras etc.), and/or other sensors. The sensor data can include information that describes the location of objects within the surrounding environment of the autonomous vehicle 102.

As one example, for LIDAR systems, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR systems, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle controller 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 may determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 may receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 may determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 202 (e.g., actuators or other devices that control gas flow, acceleration, steering, braking, etc.) to execute the selected motion plan.

Figure 4A:
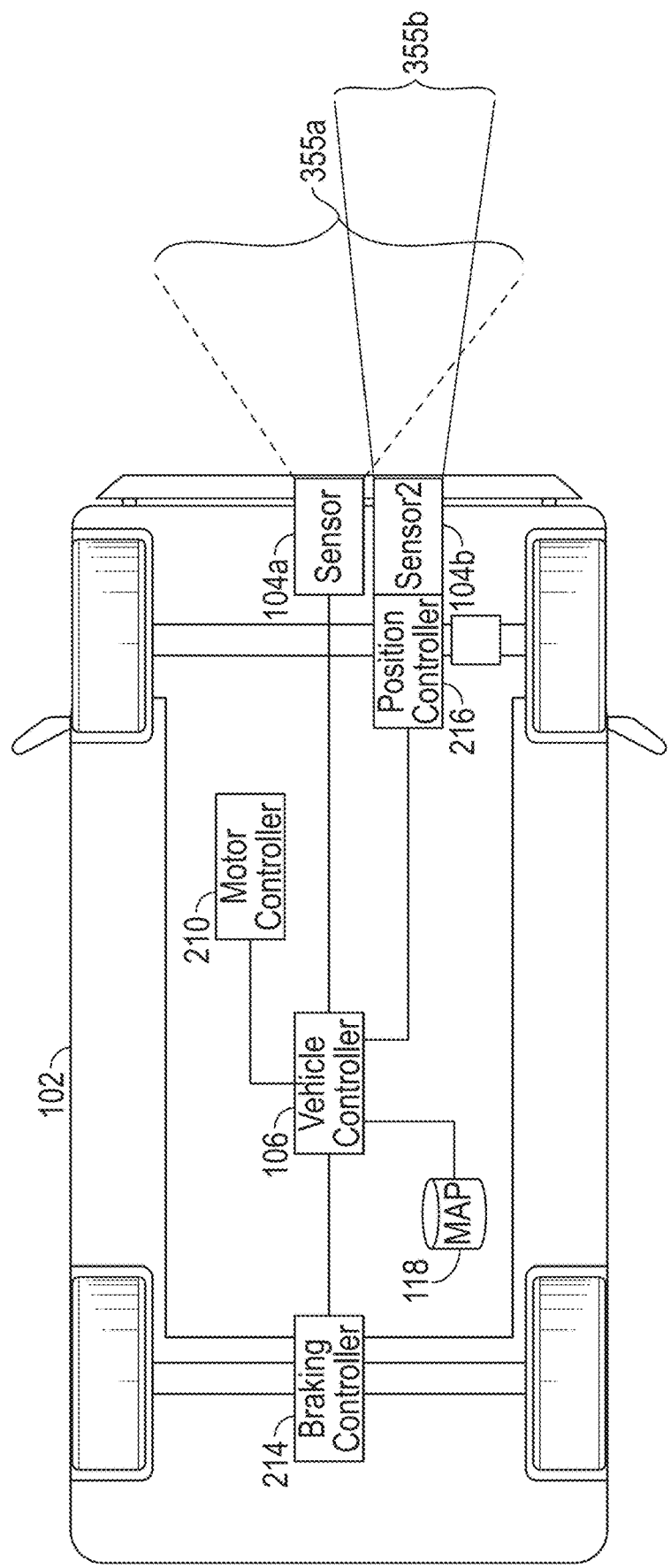
FIG. 4A is a block diagram showing components of an autonomous vehicle which may be controlled by one or more embodiments disclosed herein.

FIG. 4A is an example of an expanded view of the autonomous vehicle 102. As discussed above, the autonomous vehicle 102 may include the sensors 104a and 104b, the vehicle controller 106, and one or more vehicle controls 202. The vehicle controls 202 from FIG. 3 may include, as shown in FIG. 4A, one or more of a motor controller 210, a steering controller 212, and a braking controller 214. The expanded view of the autonomous vehicle 102 of FIG. 4A also shows the vehicle 102 including the map database 118. The controller 106 is operably connected to each of the sensor 104, motor controller 210, steering controller 212 and braking controller 214, via any known interconnect technology. In FIG. 4A, this is illustrated as a bus 230. The vehicle controller 106 may be configured to capture multiple images from the sensors 104a and 104b and compare information represented by the images to map data in the map database 118. Based at least partially on the comparison, the vehicle controller 106 may determine a position of the vehicle 102. The vehicle controller 106 may also control a position of the sensor 104b relative to the vehicle 102 by selective positioning of the sensor 104b via one or more electrically driven motors via a position controller 216.

The vehicle controller 106 may control the position and/or speed of the vehicle 102 by issuing commands to one or more of the motor controller 210, steering controller 212, and/or braking controller 214. For example, if the controller 106 determines a speed of the vehicle 102 should be increased, the controller 106 may transmit a command to the motor controller 210 indicating an increased level of fuel is to be provided to the motor. In embodiments utilizing electric motors, the vehicle controller 106 may transmit a command to the motor controller 210 indicating an increased current or voltage is to be provided to the motor. If the vehicle controller 106 determines a position of the vehicle 102 should be adjusted to the left or right, the controller 106 may send a command indicating same to the steering controller 212. In some aspects, the controller 106 may send a signal to an indicator or light within an interior of the autonomous vehicle 102 (not shown). For example, in some embodiments, if the controller 106 detects an object within a predicted path of the vehicle 102, a warning light within the vehicle may be illuminated. Alternatively, a warning tone, such as a buzzer, may be activated.

Figure 4B:
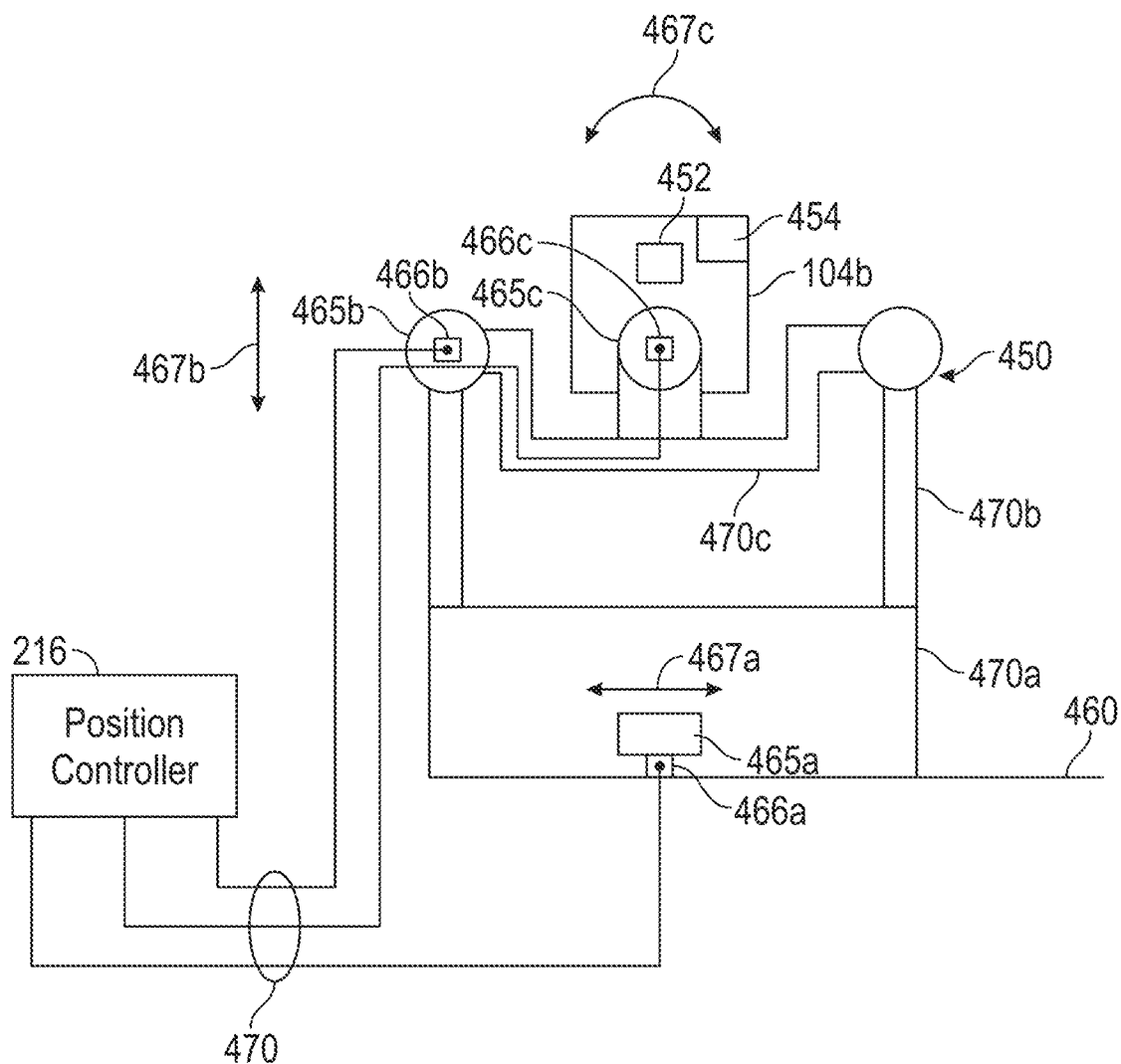
FIG. 4B shows one embodiment of a sensor configuration that provides for positioning of the sensor within three dimensions, as may be employed in at least one of the disclosed embodiments.

FIG. 4B shows one embodiment of the sensor 104b and a positioning apparatus 450. The sensor 104b is shown equipped with a lens 452 and an illumination device 454. The positioning apparatus 450 allows the sensor 104b to be positioned in three dimensions relative to a platform 460, which may be the vehicle 102 in some aspects. To position the sensor 104b relative to the platform 460, the position controller 216 may control one or more electric motors or servos, shown as 465a-c, which are attached to hinges 466a-c respectively. Servo or motor 466a is configured to position the sensor 104b in a yaw dimension 476a via movement of the hinge 465a. Servo or motor 466b is configured to position the sensor 104b in a pitch dimension 467b via hinge 465b. Servo or motor 466c is configured to position the sensor in roll dimension 467c via hinge 465c. The position controller 216 may be connected to the positioning apparatus 450 and sensor 104b by at least several wires 470, to at least control the three motors or servos 466a-c, the illumination device 454 and the sensor 104b.

Figure 5:
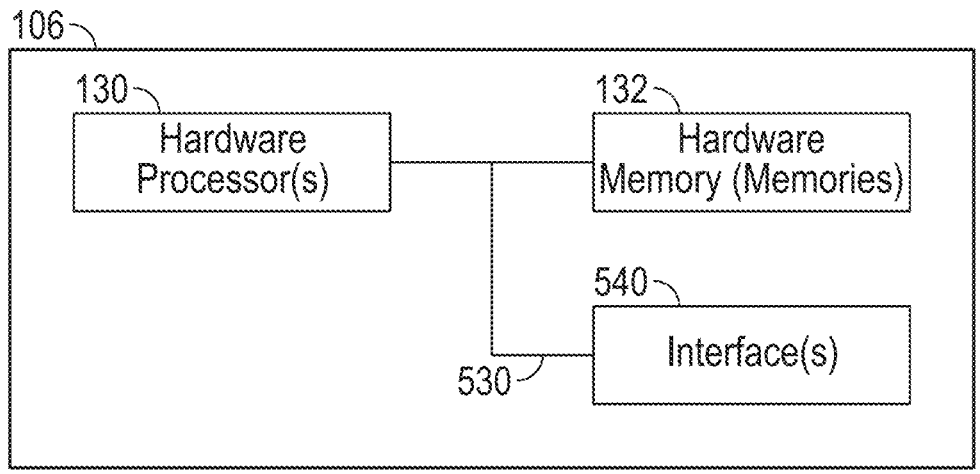
FIG. 5 is a block diagram of a vehicle controller that may be implemented in at least some of the embodiments disclosed herein.

FIG. 5 is an expanded view of an example controller or vehicle controller 106. The example controller or vehicle controller 106 of FIG. 5 includes one or more hardware processors 130, a hardware memory or memories 132, and one or more interfaces 440. The hardware processor(s) 130, memories 132, and interfaces 440 may be operably connected via any known interconnect technology, such as a bus 530. In some aspects, instructions stored in the memory/memories 132 may configure the one or more hardware processors 130 to perform one or more of the functions discussed below to provide for autonomous control of a vehicle, such as the vehicle 102. The interface(s) 540 may provide for electronic communication between the controller 106 and one or more of the motor controller 210, steering controller 212, braking controller 214, sensor 104, and/or map database 118.

Figure 6:
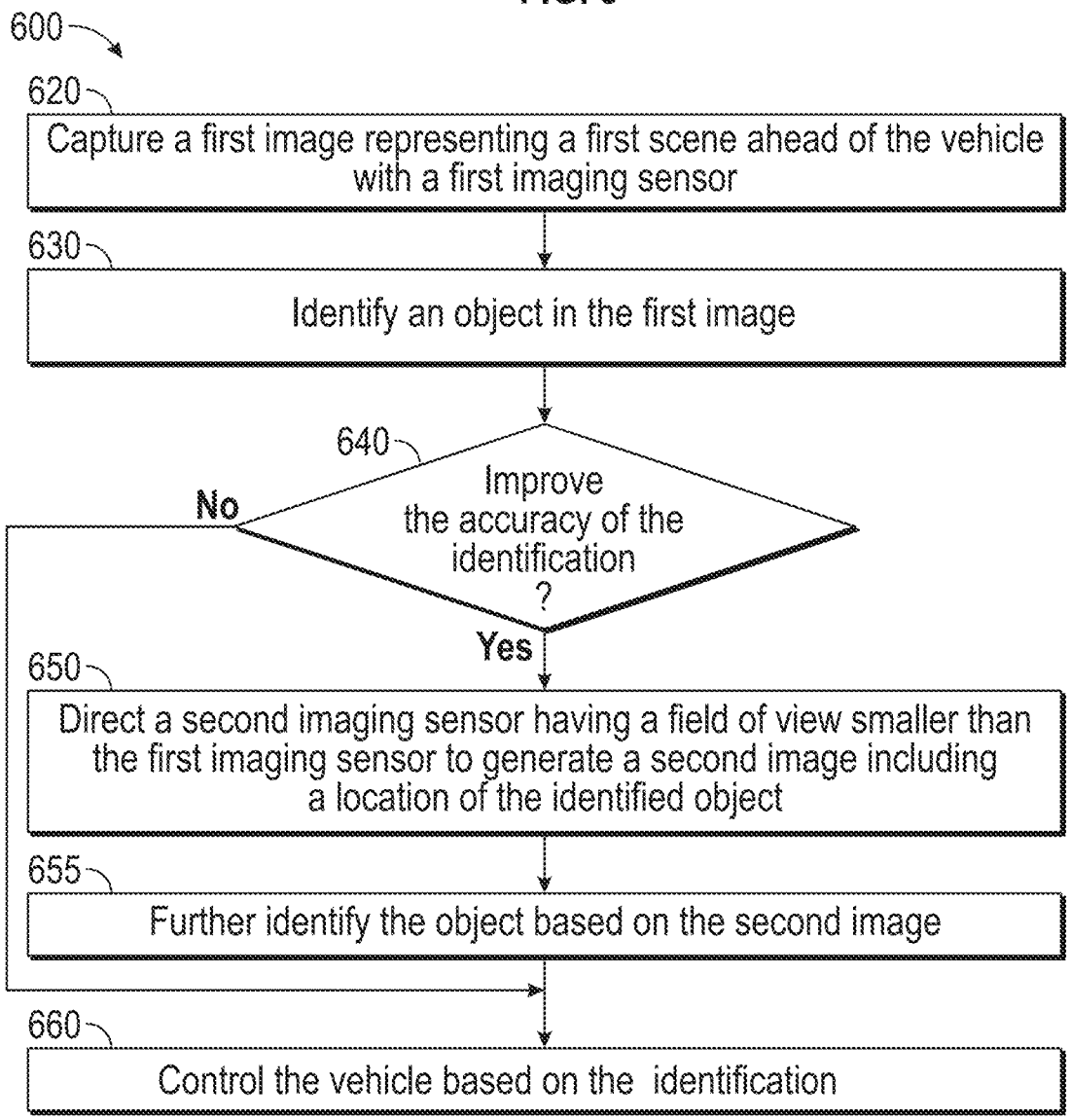
FIG. 6 is a flowchart of a method for controlling an autonomous vehicle.

FIG. 6 is a flowchart of an example method of controlling an autonomous vehicle. The process 600 discussed below with respect to FIG. 6 may be performed, in some aspects, by the vehicle controller 106. For example, instructions stored in the memory 132 may configure the one or more hardware processors 130 to perform one or more of the functions discussed below with respect to FIG. 6 and process 600.

In operation 620, a first image representing a first scene ahead of the vehicle is captured with a first sensor. The first sensor may have a first resolution, a first field of view, and a first focal distance. In some aspects, the first sensor is an imaging sensor. In some other aspects, the first sensor may be a ranging sensor.

In operation 630, an object is identified within the first image. For example, in some aspects, the object may be classified as having a particular object type within a predefined group of object types. The group of object types may include, for example, one or more of a pedestrian, a dog, a cyclist, a motorcycle, a plastic bag, and a deer. Operation 630 may determine separate probabilities that the object is each of the object types in the predefined group. For example, operation 630 may determine a set of probabilities, with each probability representing a probability that the object in the scene is a particular type of object. In one example, the object has a first probability of being a cyclist object type and a second probability of being a deer object type. In some aspects, the probabilities may be determined based on a trained model, such as a model based on a convolutional neural network. In some aspects, the convolutional neural network (CNN) may have been previously trained using a set of training images. For example, the training images may include multiple images of each object type. The training may also indicate to the CNN the type of object represented by each of the training images. Based on this training data, the CNN may determine multiple filter response values for each type of object, and associate these response values with each of the various object types. The CNN may then output a probability that an analyzed object is each of the trained object types based on the filter response values. Other methods of classifying objects are also contemplated.

Operation 630 may determine a probability that the object is each of the different object types. For example, operation 630 may determine a first probability that the object is a deer, and a second probability that the object is a pedestrian. In some aspects, the object may be classified or labeled as a particular one of the object types by selecting an object type having the highest probability of all the probabilities computed for that object in operation 630. Thus, for example, if the object is determined to have a first probability that it is a motorcycle, and all other probabilities are lower than the first probability, then the classification of the object has a confidence level equivalent to the first probability (that the object is a motorcycle in this example). In some aspects, object types may also be assigned a weight, bias, and or threshold to prioritize certain object types over others. Thus, in some aspects, a confidence level that a particular object identified in an image is a particular object type may be a product of, for example, the object type's assigned weight and a determined probability that the particular object is that particular type of object.

In some aspects, a confidence level of an object may be further influenced by whether a text recognition process was able to read text included in the object. If the text recognition process was able to recognize text, the confidence level for whether the object is a particular object type may be set to a first level, and if the text recognition process is unable to read text within the object, the confidence level may be set to a second, lower level.

Thus, in some aspects, a confidence level represents a highest probability that an object is any one particular object type. In some environments, none of the probabilities for an example object may be particularly high. Thus, the disclosed embodiments may have a relatively low confidence, in this hypothetical example, that the example object is any one object type.

Operation 640 determines whether an accuracy of the identification determined in operation 630 should be improved. In some aspects, operation 640 determines whether the set of probabilities discussed above meet one or more criterion. For example, one criterion may measure whether each of the probabilities determined by operation 630 is below a first threshold, with the threshold representing, for example, a probability upon which specific vehicle control measures may be taken based on the classification of the object.

In response to the determination of operation 640, operation 650 may direct a second sensor to capture a second image of the object. The second sensor may be able to image the object at a higher resolution than the first imaging sensor. In some aspects, the second sensor may be an imaging sensor. Alternatively, the second sensor may be a ranging sensor. In some aspects, the second sensor may be configured with a smaller field of view than the first imaging sensor, and thus provide a denser distribution of pixels to each portion of the second scene captured by the second image when compared to the first image and the first scene. In some aspects, a focal distance of the second sensor may be different than the first imaging sensor. For example, the focal distance of the second sensor may be larger than that of the first imaging sensor. This may improve the second sensor's ability to capture details of images that are further from the vehicle 102 than images captured via the first imaging sensor. In some aspects, the second sensor may also include a higher pixel density or have a larger sensor area than the first sensor.

In some aspects, operation 650 includes determining an aim point of the second sensor so as to capture the object in the second image. Determining the aim point may include determining a geographic location of the object, and estimating a position of the vehicle when the second image is captured. The estimated position may include not only a geographic location of the vehicle when the second image is captured, but also an orientation of the vehicle. For example, the orientation of the vehicle may be based on a heading of the vehicle and a pitch of the vehicle when the second image is captured. As one example, the vehicle may be on an incline or decline when the second image is captured, and thus a position of the sensor relative to the vehicle may need to adjust for the incline or decline. Furthermore, since the vehicle may be traveling down a road, a turn in the road may change a heading of the vehicle relative to the object captured in the first image, and positioning of the second sensor may need to account for any heading differences of the vehicle between when the first image was captured and when the second image was captured.

In some aspects, the first and second sensors may be intrinsically or extrinsically calibrated with each other. Such calibration may provide for an object location in a first image captured by the first sensor to be accurately transformed into an aiming point for the second sensor.

In operation 655, the object is further identified based on the second image. For example, operation 655 may determine probabilities that the object in the second image is a particular object type of a defined class of object types, as discussed above. In some aspects, operation 655 relies on the class of object determined in operation 630. In some aspects, operation 655 may reclassify the object without using any information determined about the object in operation 630. As a pixel density of a representation of the object in the second image is higher than a second pixel density of a representation of the object in the first image, the probabilities determined in operation 655 may be different than those of operation 630. For example, at least some probabilities that the object is any one of several object types within the class may decrease based on the higher pixel density of the representation. In some cases, at least one of the probabilities that the object is one of the several object types may increase relative to the probabilities determined in operation 630. Thus, in some aspects, at least one of the probabilities determined in operation 655 may be above the threshold discussed above with respect to operation 640.

In operation 660, the vehicle is controlled based on the further identification. For example, in some embodiments one of the probabilities determined in operation 655, indicating a probability that the object is a particular object in the group of objects may be above an object recognition threshold probability, indicating the object is the particular type of object for the purposes of controlling the vehicle. Thus, operation 660 may execute particular control algorithms or apply particular control rules associated with the particular type of object. For example, if the object is detected to be a pedestrian or a cyclist, control rules may provide for more space between the object and the vehicle than if the object is detected to be a paper bag.

Figure 7A:
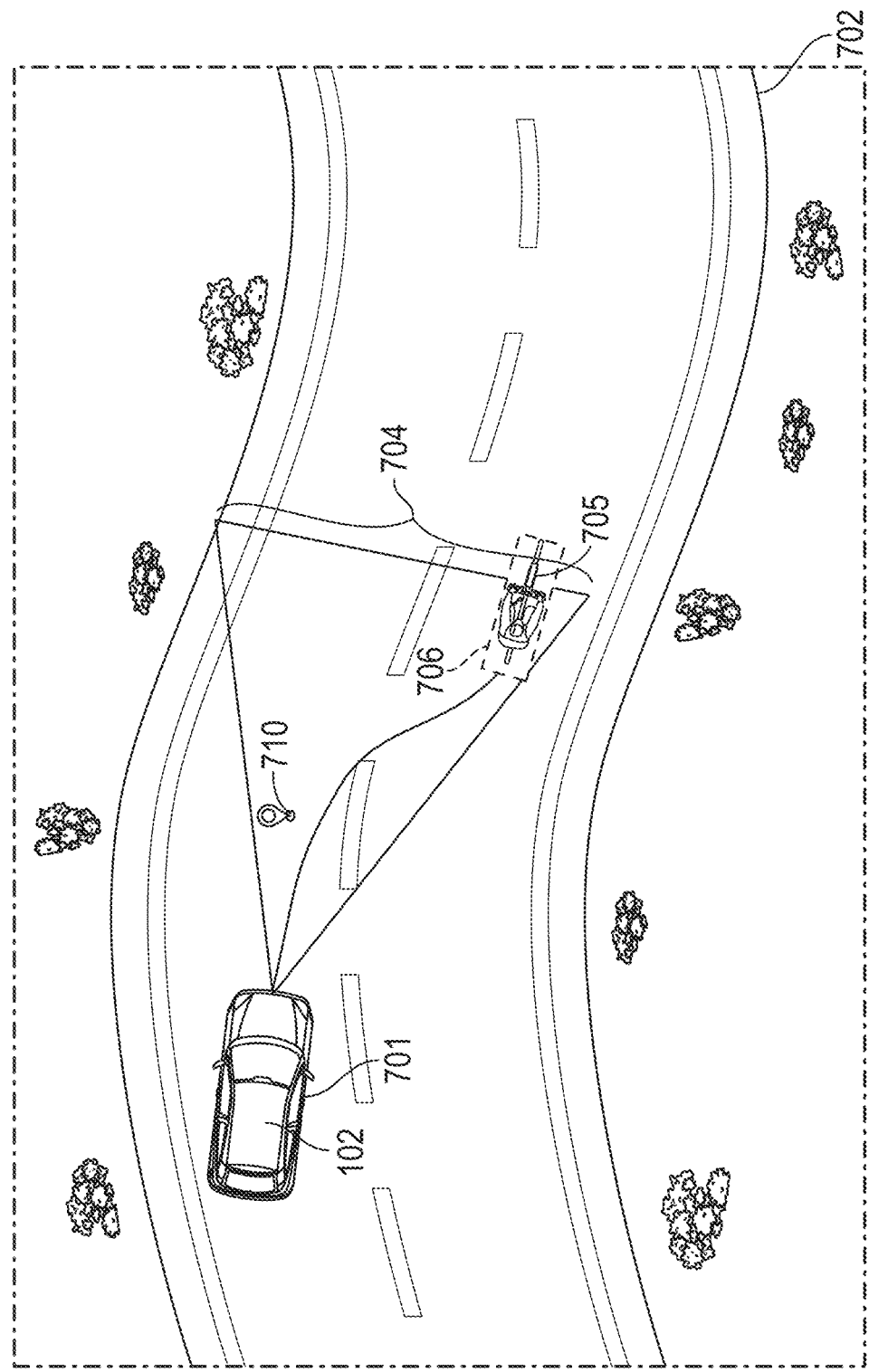
FIGS. 7A-C illustrate methods of positioning an imaging sensor in at least some of the embodiments disclosed herein.
Figure 7B:
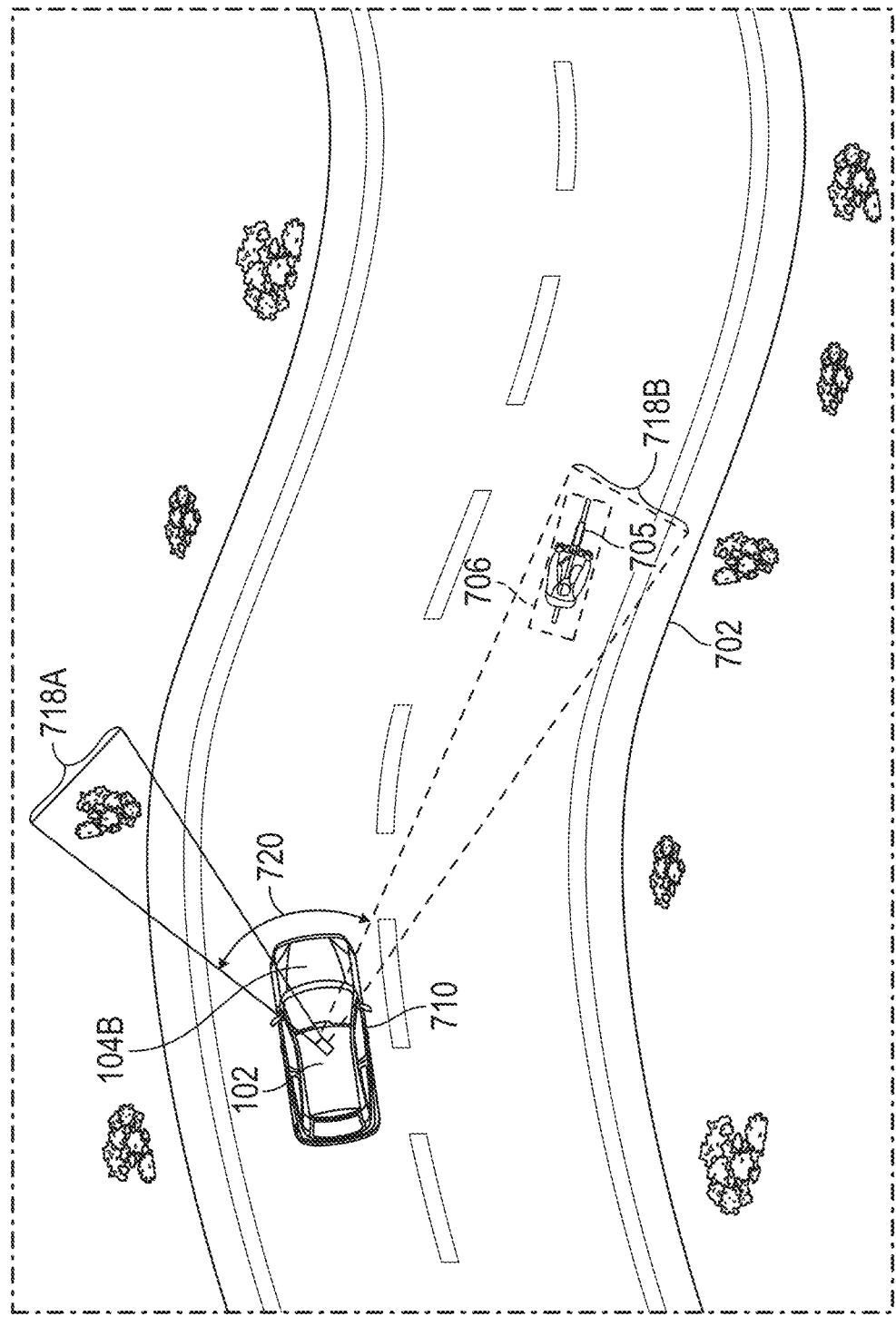
Figure 7C:
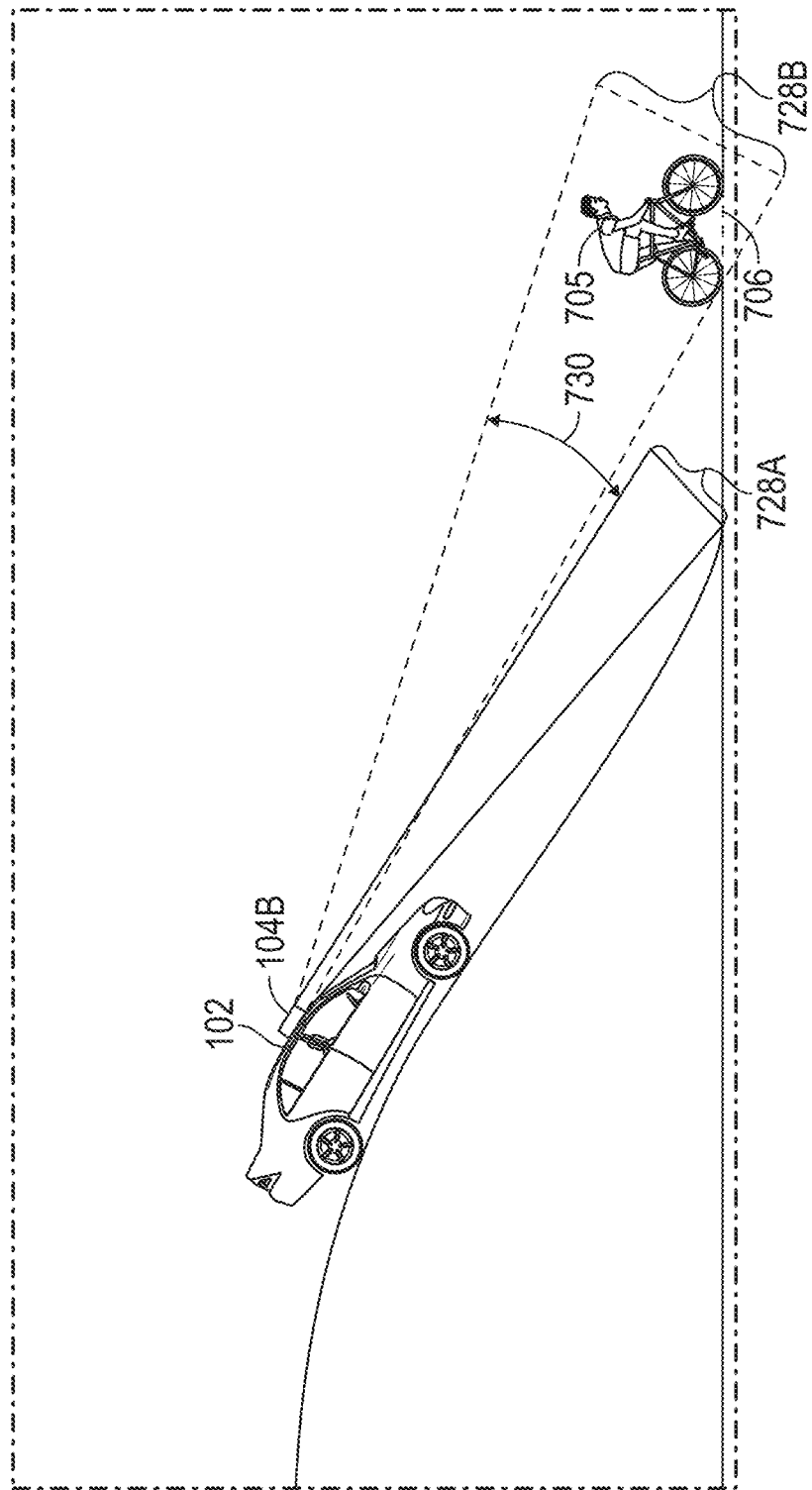

FIG. 7A-7C illustrate how a sensor (e.g. 104b) may be positioned so as to capture an object in some of the disclosed embodiments. FIG. 7A shows an overhead view of a vehicle 102 on a road 702. The vehicle 102 may capture a first image using a sensor (e.g., 104a—not shown) having a field of view 704, which includes an object 705 at a capture location 706. As discussed above, an identification of the object 705 by the vehicle controller 106 may be below a threshold confidence level. The vehicle controller 106 of the vehicle 102 may determine to capture another image of the object 705 using a second sensor (e.g. 104b). The second sensor may have a narrower field of view, which is capable of capturing a representation of the object 705 at a higher resolution than that of the first sensor. The vehicle controller 106 may then estimate where the vehicle 102 will be, a capture location 710, when the second image is captured. The estimation may be based, for example, on a speed of the truck, and a time required to position the second sensor from a first (current) sensor position to a second sensor position relative to the truck so as to properly capture the object 705. The time and speed may determine a distance the truck will travel from its position 701 before the second image is captured. The distance traveled may be applied to map data from the map database 118 indicating a path of the road ahead of the vehicle 102 to determine the capture location 710 of the vehicle 102 when the second image is captured. The capture location 710 of the vehicle may be determined in three dimensional space in some aspects.

The capture location 706 of the object 705 may also be estimated from information included in the first image. The capture location 706 may be estimated in three dimensional space in some aspects. An orientation of the vehicle 102 at the capture location 710 may also be determined. For example, the road 102 has a particular heading and slope or pitch in three dimensional space at the capture location 710 which will have an effect on an orientation of the vehicle relative to the capture location 706 of the object 705 when the vehicle is at the capture location 710. The orientation of the vehicle 102 at the capture location 710 may affect how the second sensor is to be positioned relative to the vehicle 102 in order to capture the object 705 at it's capture location 706.

Once both the capture location 706 of the object 705 and the capture location 710 of the vehicle 102 are known, and the orientation of the vehicle 102 at the capture location 710 of the vehicle 102 are known, a determination of how to position the second sensor (e.g., 104b) relative to the vehicle 102 may be made. FIG. 7B shows an overhead view of the vehicle 102 on the road 702. FIG. 7B shows that a slew or yaw angle 720 that be determined based on the capture location 706 of the object 705, capture location 710 of the vehicle 102, and the orientation of the vehicle 102 at the capture location 710. FIG. 7C shows a horizontal view of the vehicle 102 on the road 702. FIG. 7C illustrates that a pitch adjustment 730 that may also be determined based on the capture location 706 of the object 705, capture location 710 of the vehicle 102, and the orientation of the vehicle 102 at the capture location 710 of the vehicle 102.

Figure 8:
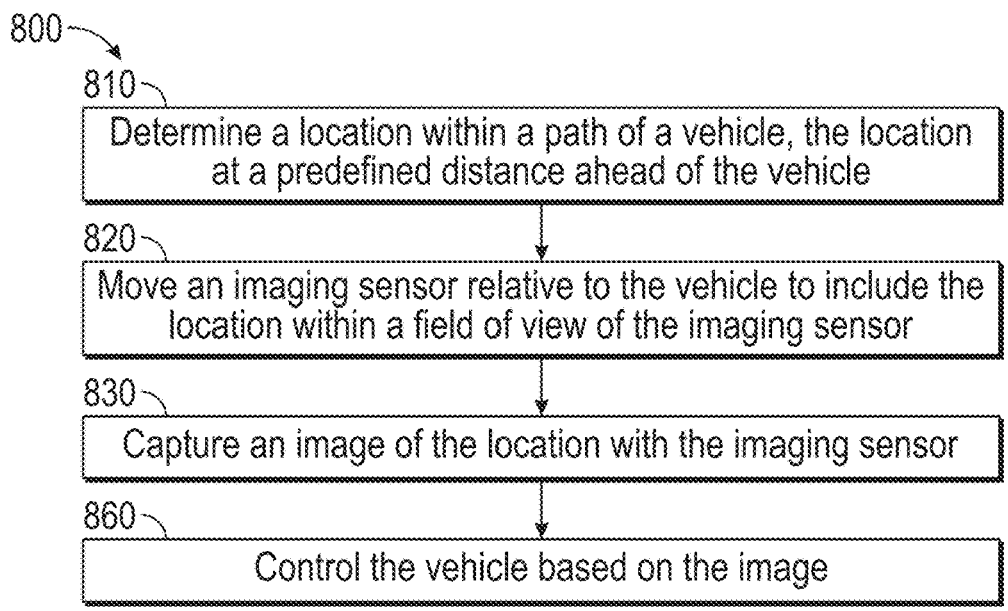
FIG. 8 is a flowchart of a method for controlling an autonomous vehicle that may be included in one or more of the embodiments disclosed herein.

FIG. 8 is a flowchart of an example method of controlling an autonomous vehicle. The process 800 discussed below with respect to FIG. 8 may be performed, in some aspects, by the vehicle controller 106. For example, instructions stored in the memory 132 may configure the one or more hardware processors 130 to perform one or more of the functions discussed below with respect to FIG. 8 and process 800.

In operation 810, a location within a path of the vehicle is determined. The location may be a predefined distance from the vehicle. In some embodiments, the location may be a predefined distance ahead of the vehicle, positioned within a predicted path of the vehicle. The predicted path may be based on one or more of map data and/or sensor data, such as sensor data from a Lidar or Radar which may determine a path of a roadway in front of the vehicle, either independently or in concert with path information provided by map data.

In operation 820, a sensor (e.g. 104*b*) is moved relative to the vehicle to include the determined location (of operation 810) to be within a field of view of the sensor. For example, in some aspects, operation 820 may operate in a similar manner as described above with respect to FIGS. 7A-7C, except that instead of a particular object being detected in a first image, process 800 may operate to capture an image on a particular point in the predicted path.

In operation 830, an image of the location is captured with the sensor.

In operation 860, the vehicle is controlled based on the image. For example, an object may be detected within a projected vehicle path within the image, and the vehicle may be controlled to avoid the object. For example, inputs may be provided to the steering controller 212, motor controller 210, and/or braking controller 214 by the vehicle controller 106 to avoid the object.

Figure 9:
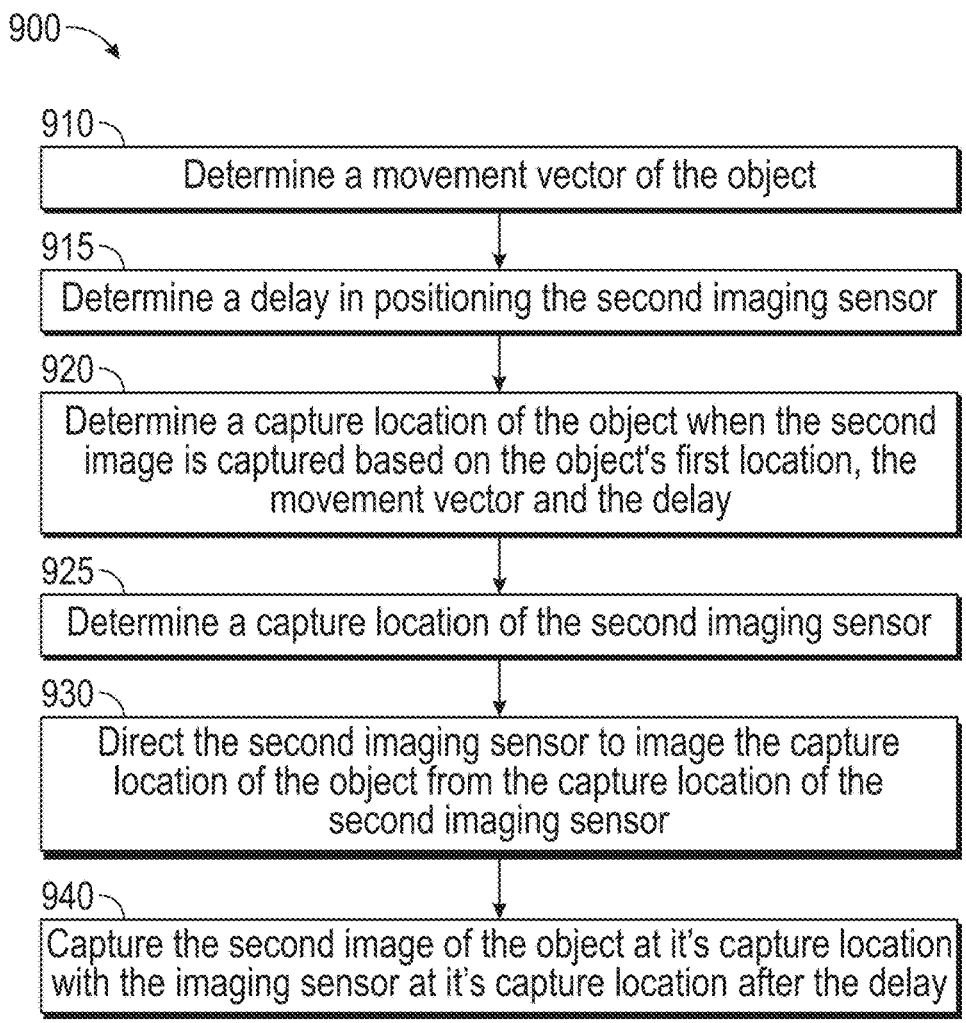
FIG. 9 is a flowchart illustrating an example embodiment of operation 650, discussed with respect to FIG. 6.

FIG. 9 is a flowchart of an example implementation of operation 650, discussed above with respect to FIG. 6. The operation 650 discussed below with respect to FIG. 9 may be performed, in some aspects, by the vehicle controller 106. For example, instructions stored in the memory 132 may configure the one or more hardware processors 130 to perform one or more of the functions discussed below with respect to FIG. 9 and operation 650.

The embodiment of operation 650 discussed below predicts a location of a (potentially) moving object such that an image of the object may be captured by a sensor. The sensor may have a relatively narrow field of view, such as the sensor 104*b*.

Positioning the sensor may take some time. For example, the second sensor may be equipped with one or more positioning motors, which may be used to traverse the second sensor through an axis in one or more of pitch, roll and/or yaw. Traversing the second sensor in one or both directions may take some time to move from a first position to a second position that allows the second sensor to image the object. During this traverse time or delay, the object may move from a position in which it was detected in an image to a second location. The operation 650 below attempts to predict this changed location and aim the second sensor so as to image that location. In one aspect, accomplishing this can be assisted through modelling and characterizing the motion performance of the positioning system (i.e. of rotational motion velocities and rates such as acceleration and deceleration to target position window limits and/or typical values).

Operation 910 determines a movement vector for the object. In some aspects, the movement vector may be determined based on a plurality of images captured by the first sensor referenced above with respect to process 600 and FIG. 6. In some aspects, this may be the sensor 104*a*. A change in position of the object between the plurality of images, and an elapsed time between when the plurality of images were captured may be used to determine both a direction and speed of the object's movement.

Operation 915 determines a delay in positioning the second sensor. The delay may be determined based on a current location of the sensor and an estimated position of the object at the time of capture. For example, the second sensor may have a traverse rate in a horizontal dimension and a traverse rate in a vertical dimension. The current location of the sensor and the estimated position of the object may have a difference in both the horizontal and vertical dimension. In some aspects, the second sensor may be configured to traverse in both the horizontal and vertical dimensions simultaneously. In other embodiments, the second sensor may only be able to traverse in a single dimension at a time, and thus, repositioning the second sensor may require at least two repositioning steps executed in a serial manner. The delay may then be determined based on a time to traverse horizontally and vertically.

In operation 920, a capture location of the object when the second image is captured is determined. The capture of the object may be based on the motion vector and the delay. Operation 920 predicts where the object will be when the second sensor is in a position to capture an image of the object.

In operation 925, a capture location of the second sensor is determined. The capture location of the second sensor may be based on a position of a vehicle to which the second sensor is mounted at the time an image of the object is captured. Thus, the position of the vehicle may be estimated based on a current position of the vehicle, the vehicle's speed, map data indicating a path the vehicle will take, and a time that the image will be captured. The time of capture may be based, at least in part, on the delay determined in operation 915. In other words, operation 925 predicts a location of the second sensor when the second sensor is properly positioned to capture an image of the object. Proper positioning may include determination of a stabilized position within an acceptable positioning error window. The error window may measure a predefined position range or a number of oscillations within the error window. This is made more complex due to motion of the vehicle and also potential motion of the object itself. Both of these factors may be considered when determining a position of the sensor and when to capture the image.

In operation 930, the second sensor is directed to image the location. Positioning the second sensor may include operating a first electric motor to position the second sensor in a yaw axis so as to be pointed in a direction consistent with the capture location of the object and the capture location of the sensor. Operation 930 may also include operating a second electric motor to position the second sensor along a pitch axis so as to be positioned consistent with the capture location of the sensor and the capture location of the object. In some embodiments, positioning a sensor may include activating at least one motor. The motor may include a feedback mechanism such as a rotary encoder. This may allow the disclosed embodiments to determine an absolute position of each controllable axis of the sensor. In some aspects, sensors having rotary encoders with high resolution may be utilized.

In operation 940, the second image is captured. The capture is commanded after the second sensor is in the position as directed by operation 930, which should consume an amount of time substantially equivalent to the delay determined in operation 915.

Figure 10:
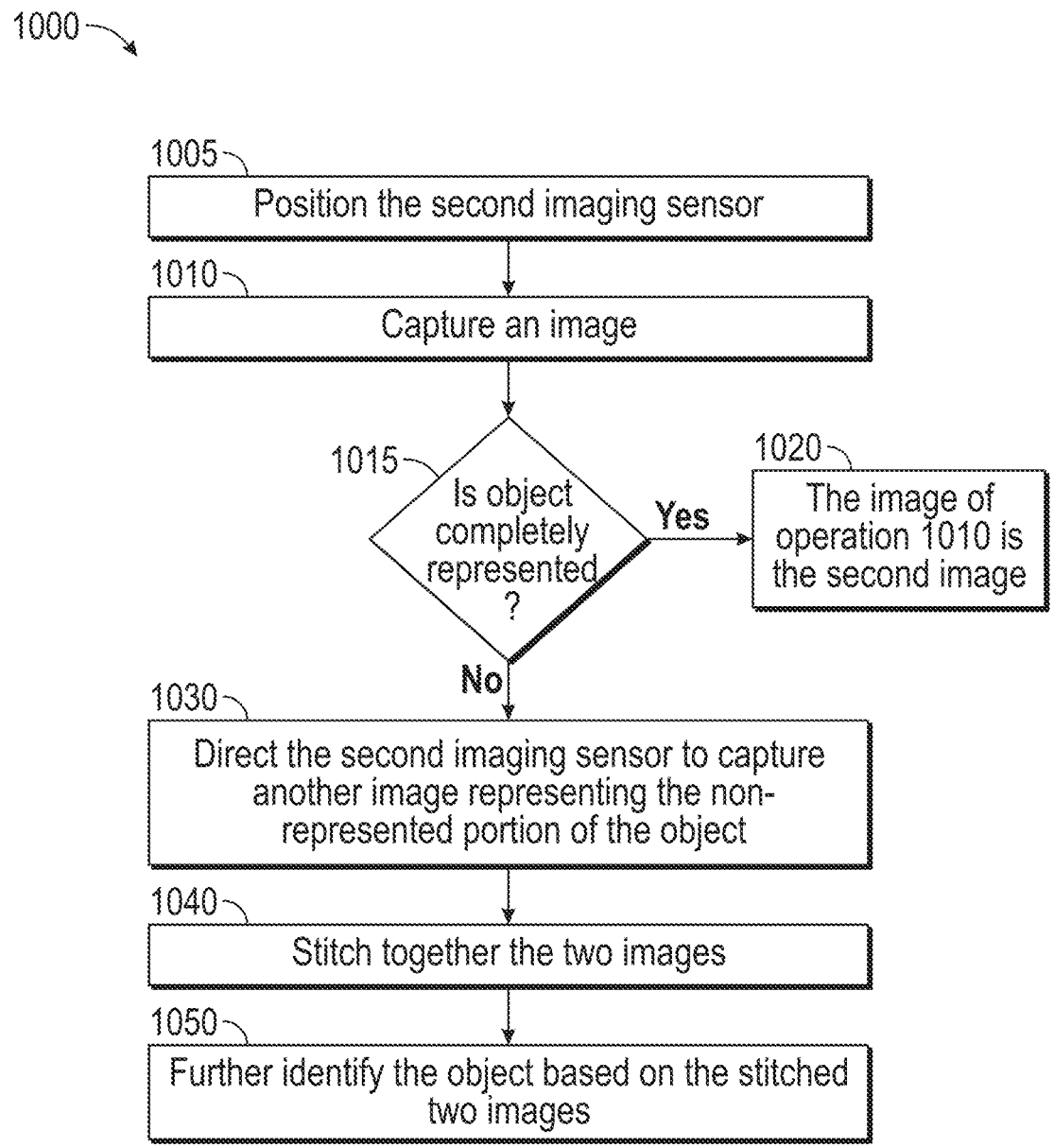
FIG. 10 is a flowchart illustrating an example embodiment of operation 650, discussed with respect to FIG. 6.

FIG. 10 is a flowchart of an example implementation of operation 650, discussed above with respect to FIG. 6 and process 600. The operation 650 discussed below with respect to FIG. 10 may be performed, in some aspects, by the vehicle controller 106. For example, instructions stored in the memory 132 may configure the one or more hardware processors 130 to perform one or more of the functions discussed below with respect to FIG. 10 and process 1000.

The embodiment described below with respect to FIG. 10 may be implemented to ensure detailed representations of object may be captured and proper recognition of objects is attained. For example, in some scenarios, an object may be moving across the field of view of the sensor 401a at a relatively rapid rate. Thus, a position of the object may change substantially between the time that a second image of the object is requested, and the second image can be captured. In some cases, this may result in the first higher resolution image captured (e.g. the second image of process 600) failing to fully represent the object. In some cases, the object may move completely out of the field of view of the sensor (e.g. 401b) before an image can be captured, resulting in the object being absent from the second image discussed above (with respect to FIG. 6 and process 600). The embodiment of operation 650 discussed with respect to FIG. 10 provides for an adaptive information collection approach, which analyzes the image obtained by the second sensor to determine if it effectively captured a representation of the object. If the object was captured completely, operation 650 completes and control is returned to process 600 of FIG. 6. If the captured image either only partially represents the object or missed the object completely, an additional image may be captured in an attempt to capture a complete representation of the object using the higher resolution capabilities of the second sensor (e.g. 401b).

In operation 1005, the second sensor is positioned such that a field of view of the second sensor includes an estimated location of the object identified in operation 630 of process 600 (see FIG. 6).

In operation 1010, an image is captured by the second sensor with the second sensor in the position obtained in operation 1005. Decision operation 1015 determines whether the object is completely represented by the image. For example, in some aspects, the image captured in operation 1010 may be analyzed to classify pixels of the image as either included in the object or not included in the object. In some aspects, this may include determining a boundary of the object within the image. The boundary of the object may represent a region of interest within the image. Operation 1015 may then determine whether pixels classified as not included in the object itself completely surround a set of pixels classified as being included in the object. In other words, operation 1015 may determine whether the entire region of interest is include in the image captured in operation 1010. If the object is completely surrounded by non-object pixels, then operation 1010 may determine the object is completely represented. If the object is not completely surrounded by non-object pixels, then decision operation 1015 may determine the object is not completely represented.

If the object is completely represented, operation 650 moves from decision operation 1015 to operation 1020, which returns the image captured in operation 1010 as the second image to process 600. Otherwise, operation 650 moves from decision operation 1015 to operation 1030, which directs the second sensor to image a location estimated to include the non-represented portion of the object. In some aspects, operation 1030 may include one or more of the functions discussed above with respect to FIGS. 7A-7C to capture the additional image of the object. For example, capturing the additional image may require a new estimate of the object's location when the additional image can be captured. This may be based, for example, on a delay in moving the second sensor from an existing or current position to a position that allows the second sensor to capture the estimated location within the second sensor's field of view.

In some aspects, operation 1030 determines an amount of correction necessary to direct the second sensor to capture an additional portion of the non-represented object. This amount of correction may be provided to a machine learning algorithm used to steer the second sensor.

Operation 1040 then stitches together the two images (i.e. the images captured in operation 1010 and 1030). In some aspects, the two images may be taken from different perspectives, due to vehicle motion between capturing of the image in operation 1010 and the other image in operation 1030. Thus, the stitching may first perform perspective correction on one or both images such that the two images have a common perspective. The two images may then be stitched together. In some aspects, the object may be completely represented then by the two stitched together images. In some other aspects, the object may be represented in a portion of the stitched together image representing only one of the two images (for example, if the image captured in operation 1010 failed to capture any portion of the object.

Figure 11:
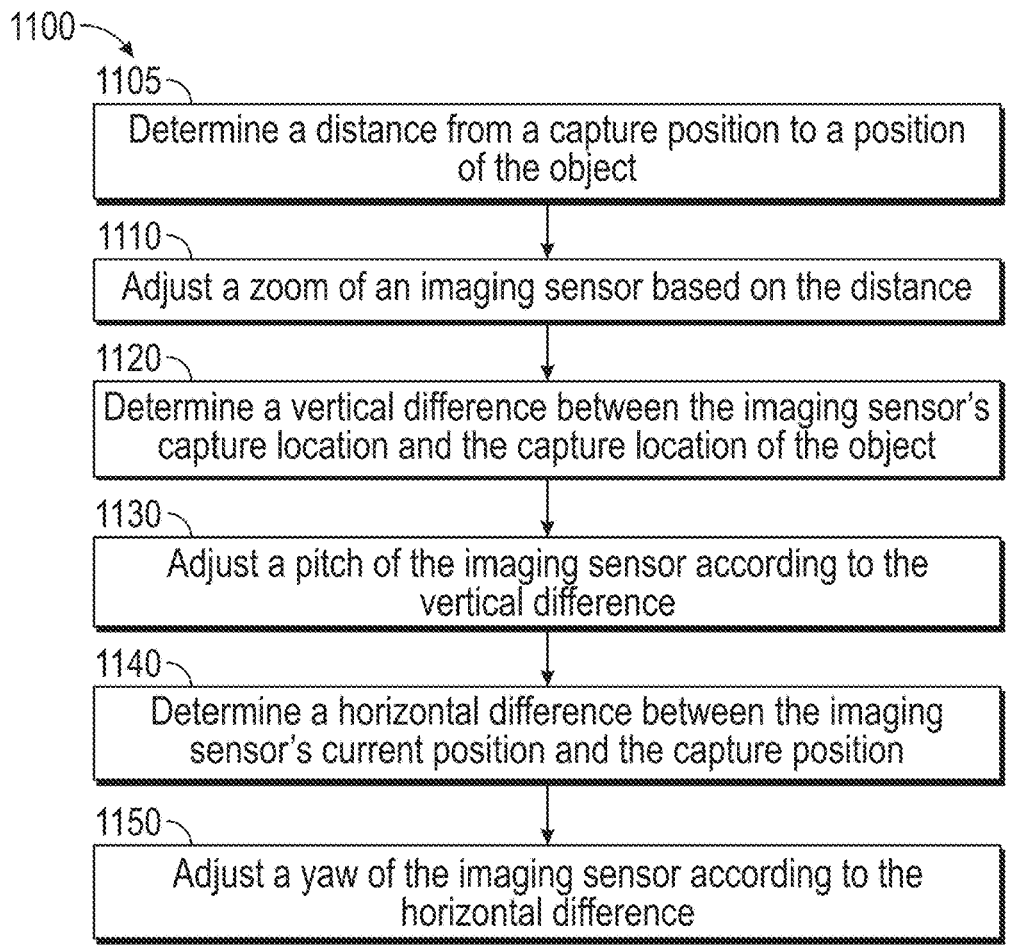
FIG. 11 is a flowchart illustrating an example embodiment of operation 930, discussed with respect to FIG. 9.

FIG. 11 is a method of adjusting settings of imaging sensor to capture an object. The settings may include zoom settings and one or more orientation settings of the imaging sensor with respect to a platform to which the imaging sensor may be attached. For example, in some embodiments, the imaging sensor may be attached to a vehicle (e.g. 102), but be configured with one or more positioning apparatus, such as electric motors, that can change a position of the imaging sensor relative to the platform. For example, the position of the imaging sensor may be changed with respect to a horizontal and/or vertical position relative to the platform. This may allow the imaging sensor to be "pointed" at an object to facilitate capturing of an image of the object. Additionally, depending on a distance to the object, a zoom setting (if so equipped) of the imaging sensor may be adjusted to frame the object within a field of view of the imaging sensor.

The operation 930 discussed below with respect to FIG. 11 may be performed, in some aspects, by the vehicle controller 106. For example, instructions stored in the memory 132 may configure the one or more hardware processors 130 to perform one or more of the functions discussed below with respect to FIG. 11 and operation 930.

In operation 1105, a distance from a capture location of an imaging sensor to a capture location of the object is determined. The capture location of the object may correspond to the capture location of the object discussed above with respect to operation 920. The capture location of the imaging sensor is a position of the imaging sensor when the image is captured. The capture location of the imaging sensor may be consistent with the capture location determined in operation 925 of FIG. 9. A distance between the two positions may then be determined via geometry. The distance determined in operation 1105 may be a straight line distance, which may be across both a horizontal and vertical dimension (distance in a z axis for example).

In operation 1110, a zoom setting of a sensor (e.g. 104b) is adjusted based on the distance. The zoom setting may be adjusted so as to provide an appropriate framing of the object within a field of view of the second sensor. For example, a smaller zoom setting may be appropriate for larger objects and a larger zoom setting may be appropriate for smaller objects. The appropriate amount of zoom may also be based on a distance to the object, with the zoom setting being generally proportional to the distance, without consideration of object size. In some aspects, operation 1110 may be accomplished via a lookup table mapping the distance determined in operation 1105 to a zoom setting. In some other aspects, an estimate of object size may be provided to operation 1110. For example, the estimate of object size may be generated by operation 630, discussed above with respect to FIG. 6.

In some aspects, operation 1110 may adjust one or more of the zoom setting, a focus setting, focal plane, or an aperture of the imaging sensor based on the distance.

In operation 1120, a vertical difference between the imaging sensor's capture location and the capture location of the object is determined.

In operation 1130, a pitch of the imaging sensor is adjusted based on the vertical distance. For example, as discussed above with respect to FIG. 7C, the capture location of the imaging sensor may correspond to position 710, while a capture location of the object may correspond to location 706. The pitch may be adjusted by a pitch adjustment (e.g., 730 of FIG. 7C), which represents a difference between a current pitch setting of the imaging sensor and a pitch setting necessary for the second sensor to include the object (e.g. 705) within its field of view.

In operation 1140, a horizontal difference between a current horizontal position of the imaging sensor and a second horizontal position necessary to bring the object within a field of view of the imaging sensor is determined. As discussed above with respect to FIG. 7B, the yaw 720 may be adjusted to image the object 705 at its capture location 706 when the vehicle 102 is at its capture location 710.

In operation 1150, a yaw of the imaging sensor is adjusted to point the imaging sensor as appropriate so as to image the object when it is at the capture location and the imaging sensor is at its respective capture location. The adjustment to the yaw may be based on the difference determined in operation 1150.

Figure 12:
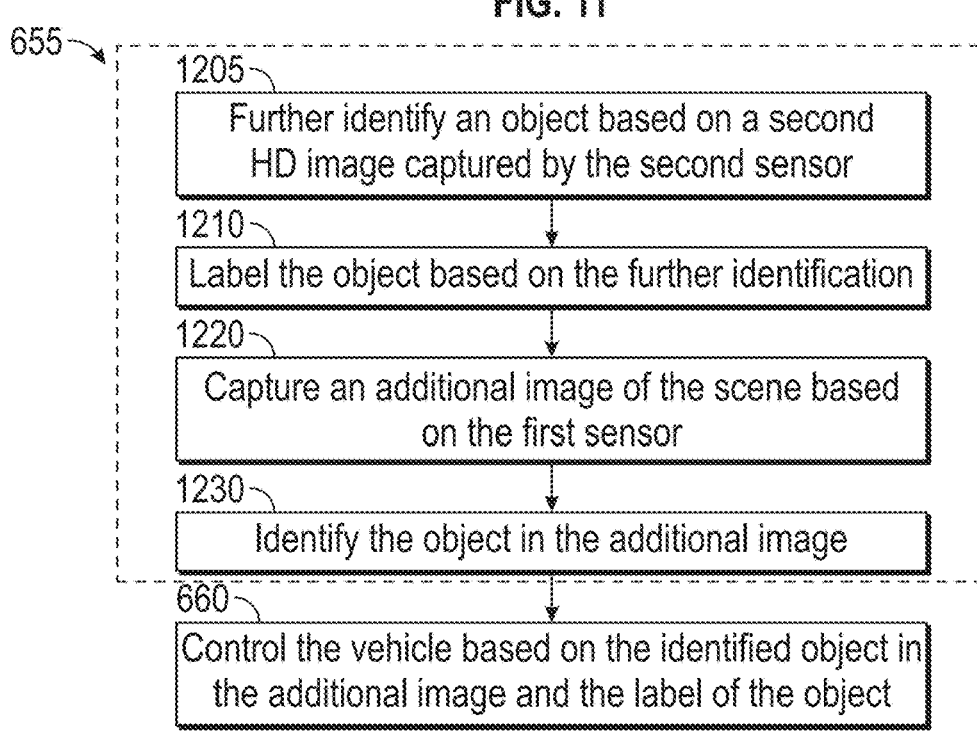
FIG. 12 is a flowchart illustrating an example embodiment of operations 650 and 660, discussed with respect to FIG. 6.

FIG. 12 is a flowchart of an example implementation of operations 655 and 660, discussed above with respect to FIG. 6. Operations 650 and/or 660 discussed below with respect to FIG. 12 may be performed, in some aspects, by the vehicle controller 106. For example, instructions stored in the memory 132 may configure the one or more hardware processors 130 to perform one or more of the functions discussed below with respect to FIG. 12 and operations 655 and/or 660.

FIG. 12 is drafted to be a more detailed description of some embodiments of operations 655 and 660 of FIG. 6. Thus, the description below of FIG. 12 may refer back to terms used in the description of FIG. 6.

In operation 1205, the object is further identified based on the second image captured by the second sensor. For example, the object may be classified as one or more of a pedestrian, bicyclist, car, bus, deer, or other object based on the second image. In operation 1210, the object is labeled based on the further identification. Labeling the object may include storing an association between characteristics of the object and the classification determined in operation 1205. For example, an approximate position, size, shape, motion vector, or other characteristics of the object may be stored along with the classification. The label may be used by a vehicle control algorithm, such as may be implemented by the vehicle controller 106, to manage control of the vehicle 102 based on the object. For example, the vehicle control algorithm may maintain different control rules for different types of objects. As one example, a vehicle may be expected to have future behavior based on a first set of rules while a pedestrian may be expected to have future behavior based on a second set of rules. A rule set appropriate for the type of object may be applied to the object as part of the vehicle control algorithm to predict where the object may be located at a future time, and whether the object is expected to present a need for changes to vehicle control inputs based, at least in part, on the predicted location in the future.

In operation 1220, an additional image is captured by the first sensor. As discussed above, the first sensor may provide a lower resolution image than the second sensor.

In operation 1230, the object is identified in the additional image. For example, in some aspects, second characteristics of the object may be identified in the addition image and compared to the characteristics of the object stored in operation 1210 to determine the object in the additional image is the same object as was previously captured in the second image (which was captured by the second sensor in operation 650.

In operation 660, the vehicle is controlled based on the identified object in the additional image and the label of the object. In other words, the object was labeled according to a detection of the object in an image captured by the second sensor. This label may persist beyond the second image and be used to improve control of the autonomous vehicle, even based on subsequent images captured by a lower resolution sensor such as the first sensor. Thus, in some conditions, the second sensor may be used to identify an object once, and then the identification can persist for multiple control cycles of the autonomous vehicle, while the second sensor may be available to capture images of other objects that may be within a proximity of the autonomous vehicle.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, Uber, Inc., All Rights Reserved.

Example 1 is a method of controlling a vehicle, comprising: capturing a first image of a scene with a first sensor; identifying an object in the first image at a confidence level based on the first image; determining the confidence level of the identifying is below a threshold; in response to the confidence level being below the threshold: directing a second sensor having a field of view smaller than the first sensor to generate a second image representing a location of the identified object, further identifying the object in the scene based on the second image, and controlling the vehicle based on the further identification of the object.

In Example 2, the subject matter of Example 1 optionally includes wherein a resolution of the second image is higher than a second resolution of the first image.

In Example 3, the subject matter of any one or more of Examples 1-2 optionally include wherein the second sensor is an imaging sensor or a ranging sensor.

In Example 4, the subject matter of any one or more of Examples 1-3 optionally include determining the object in the scene is a sign; failing to recognize text within the sign; and setting the confidence level of the identification of the object below the threshold based on the failure.

In Example 5, the subject matter of any one or more of Examples 1-4 optionally include classifying the object in the scene as a first type of object in a group of object types, wherein the confidence level relates to a confidence of the classification of the object as the first type of object, wherein the further identifying changes the classification of the object from the first type of object to a second type of object based on the further identifying.

In Example 6, the subject matter of Example 5 optionally includes wherein the group of objects includes a motorcycle object type, pedestrian object type, plastic bag object type, concrete block object type, cyclist object type, car object type, truck object type, bus object type, temporary traffic control device object type, animal object type, traffic light object type, sign object type.

In Example 7, the subject matter of any one or more of Examples 1-6 optionally include ° in azimuth.

In Example 8, the subject matter of any one or more of Examples 1-7 optionally include estimating a distance to the identified object; and adjust a focus of the second sensor based on the estimated distance.

In Example 9, the subject matter of Example 8 optionally includes wherein adjusting the focus of the second sensor comprises adjusting an aperture, focusing lens or plane of focus of the second sensor.

In Example 10, the subject matter of any one or more of Examples 1-9 optionally include estimating a width or height of the identified object; and adjust a zoom of the second sensor based on the estimated width or height.

In Example 11, the subject matter of any one or more of Examples 1-10 optionally include determining a region of interest based on the identified object; determining the region of interest is larger than a field of view of the second sensor, wherein the second image excludes a first portion of the region of interest; directing the second sensor to capture the first portion of the region of interest in a third image; generating a fourth image by stitching together the second and third images, wherein the further identifying of the object is based on the fourth image.

In Example 12, the subject matter of any one or more of Examples 1-11 optionally include wherein the second sensor is configured with an active illumination device that is synchronized to illuminate when the second sensor captures an image, the active illumination device configured with a field of view corresponding to the field of view of the second sensor.

Example 13 is a method of controlling a vehicle, comprising: determining a location of a path of the vehicle at a predefined distance ahead of the vehicle; moving a first sensor relative to the vehicle to image the location; capturing an image of the location with the first sensor; controlling the vehicle based on the image.

In Example 14, the subject matter of Example 13 optionally includes wherein the determining of the location is further based on detection of lane markings in the first image, and calculating a point centered in the lane a predefined distance ahead of the vehicle.

In Example 15, the subject matter of any one or more of Examples 13-14 optionally include obtaining, from a database, an aim point for the first sensor based on a location of the vehicle, wherein the location is based on the aim point.

In Example 16, the subject matter of any one or more of Examples 13-15 optionally include wherein the determining of the location is based on one or more of map data; LIDAR data or RADAR data.

In Example 17, the subject matter of Example 16 optionally includes wherein the determining of the location is based on one or more of terrain, road, and object map prior data.

In Example 18, the subject matter of any one or more of Examples 13-17 optionally include wherein one or more of the first and second sensors is a ranging sensor.

Example 19 is a computing system for a vehicle, comprising: one or more hardware processors; one or more tangible, non-transitory, computer readable media that collectively store instructions that when executed by the one or more hardware processors cause the one or more hardware processors to perform operations, the operations comprising: capturing a first image of a scene with a first sensor; identifying an object in the first image at a confidence level based on the first image; determining the confidence level of the identifying is below a threshold; in response to the confidence level being below the threshold: directing a second sensor having a field of view smaller than the first sensor to generate a second image representing a location of the identified object, further identifying the object in the scene based on the second image, and controlling the vehicle based on the further identification of the object.

In Example 20, the subject matter of Example 19 optionally includes wherein a resolution of the second image is higher than a second resolution of the first image.

In Example 21, the subject matter of any one or more of Examples 19-20 optionally include wherein the second sensor is an imaging sensor or a ranging sensor.

In Example 22, the subject matter of any one or more of Examples 19-21 optionally include determining the object in the scene is a sign; failing to recognize text within the sign; and setting the confidence level of the identification of the object below the threshold based on the failure.

In Example 23, the subject matter of any one or more of Examples 19-22 optionally include classifying the object in the scene as a first type of object in a group of object types, wherein the confidence level relates to a confidence of the classification of the object as the first type of object, wherein the further identifying changes the classification of the object from the first type of object to a second type of object based on the further identifying.

In Example 24, the subject matter of Example 23 optionally includes wherein the group of objects includes a motorcycle object type, pedestrian object type, plastic bag object type, concrete block object type, cyclist object type, car object type, truck object type, bus object type, temporary traffic control device object type, animal object type, traffic light object type, sign object type.

In Example 25, the subject matter of any one or more of Examples 19-24 optionally include estimating a distance to the identified object; and adjust a focus of the second sensor based on the estimated distance.

In Example 26, the subject matter of Example 25 optionally includes wherein adjusting the focus of the second sensor comprises adjusting an aperture, focusing lens or plane of focus of the second sensor.

In Example 27, the subject matter of any one or more of Examples 19-26 optionally include estimating a width or height of the identified object; and adjust a zoom of the second sensor based on the estimated width or height.

In Example 28, the subject matter of any one or more of Examples 19-27 optionally include determining a region of interest based on the identified object; determining the region of interest is larger than a field of view of the second sensor, wherein the second image excludes a first portion of the region of interest; directing the second sensor to capture the first portion of the region of interest in a third image; generating a fourth image by stitching together the second and third images, wherein the further identifying of the object is based on the fourth image.

In Example 29, the subject matter of any one or more of Examples 19-28 optionally include wherein the second sensor is configured with an active illumination device that is synchronized to illuminate when the second sensor captures an image, the active illumination device configured with a field of view corresponding to the field of view of the second sensor.

Example 30 is a method of controlling a vehicle, comprising: capturing a first image of a scene with a first sensor; identifying an object in the first image determining whether to improve an accuracy of the identification; in response to a determination to improve the accuracy: directing a second sensor having a field of view smaller than the first sensor to generate a second image representing a location of the identified object, further identifying the object based on the second image, and controlling the vehicle based on the further identified object.

In Example 31, the subject matter of Example 30 optionally includes determining the object in the scene is a sign; failing to recognize text within the sign; and determining to improve the accuracy based on the failure.

In Example 32, the subject matter of any one or more of Examples 30-31 optionally include determining a first probability that the object in the scene is a first type of object in a group of object types based on the first image, and determining a second probability that the object in the scene is a second type of object in the group of object types based on the first image, and updating the probabilities based on the further identifying.

In Example 33, the subject matter of Example 32 optionally includes wherein the group of objects includes a motorcycle object type, pedestrian object type, plastic bag object type, concrete block object type, cyclist object type, car object type, truck object type, bus object type, temporary traffic control device object type, animal object type, traffic light object type, sign object type.

In Example 34, the subject matter of any one or more of Examples 30-33 optionally include determining a region of interest based on the identified object; determining the region of interest is larger than a field of view of the second sensor, wherein the second image excludes a first portion of the region of interest; directing the second sensor to capture the first portion of the region of interest in a third image; generating a fourth image by stitching together the second and third images, wherein the further identifying is based on the fourth image.

In Example 35, the subject matter of any one or more of Examples 30-34 optionally include wherein the second sensor is configured with an active illumination device that is synchronized to illuminate when the second sensor captures an image, the active illumination device configured with a field of view corresponding to the field of view of the second sensor.

In Example 36, the subject matter of any one or more of Examples 30-35 optionally include capturing another image with a third sensor; fusing the other image with the first image, wherein the identifying of the object is based on the fusing of the other image with the first image.

Example 37 is a system for controlling a vehicle, comprising: hardware processing circuitry; a hardware memory storing instructions that when executed by the hardware processing circuitry configure the hardware processing circuitry to perform operations comprising: capturing a first image of a scene with a first sensor; identifying an object in the first image determining whether to improve an accuracy of the identification; in response to a determination to improve the accuracy: directing a second sensor having a field of view smaller than the first sensor to generate a second image representing a location of the identified object, further identifying the object based on the second image, and controlling the vehicle based on the further identified object.

In Example 38, the subject matter of Example 37 optionally includes the operations further comprising: determining the object in the scene is a sign; failing to recognize text within the sign; and determining to improve the accuracy based on the failure.

In Example 39, the subject matter of any one or more of Examples 37-38 optionally include the operations further comprising determining a first probability that the object in the scene is a first type of object in a group of object types based on the first image, and determining a second probability that the object in the scene is a second type of object in the group of object types based on the first image, and updating the probabilities based on the further identifying.

In Example 40, the subject matter of Example 39 optionally includes wherein the group of objects includes a motorcycle object type, pedestrian object type, plastic bag object type, concrete block object type, cyclist object type, car object type, truck object type, bus object type, temporary traffic control device object type, animal object type, traffic light object type, sign object type.

In Example 41, the subject matter of any one or more of Examples 37-40 optionally include the operations further comprising: determining a region of interest based on the identified object; determining the region of interest is larger than a field of view of the second sensor, wherein the second image excludes a first portion of the region of interest; directing the second sensor to capture the first portion of the region of interest in a third image; generating a fourth image by stitching together the second and third images, wherein the further identifying is based on the fourth image.

In Example 42, the subject matter of any one or more of Examples 37-41 optionally include wherein the second sensor is configured with an active illumination device that is synchronized to illuminate when the second sensor captures an image, the active illumination device configured with a field of view corresponding to the field of view of the second sensor.

In Example 43, the subject matter of any one or more of Examples 37-42 optionally include the operations further comprising: capturing another image with a third sensor; fusing the other image with the first image, wherein the identifying of the object is based on the fusing of the other image with the first image.

I claim:

1. A method of controlling a vehicle, the method comprising:
    capturing a first image with a first sensor, wherein the first image includes an object;
    based on an attempt to identify the object in the first image, determining a capture location of the object for obtaining a second image of the object by a second sensor, wherein the second sensor is configured with an active illumination device that is synchronized to illuminate when the second sensor captures the second image;
    directing the second sensor to capture the second image of the object at the capture location of the object, wherein the active illumination device illuminates a field of view corresponding to the capture location of the object;
    identifying the object based on the second image; and
    controlling the vehicle based on identifying the object.

2. The method of claim 1, wherein directing the second sensor to capture the second image comprises determining an orientation of the vehicle relative to the capture location.

3. The method of claim 1, wherein directing the second sensor to capture the second image comprises:
    determining a speed associated with the vehicle;
    determining a time to position the second sensor from a first position to a second position, wherein the second position is associated with the capture location; and
    based on the speed and the time to position the second sensor, directing the second sensor to the second position to capture the second image.

4. The method of claim 3, further comprising:
    accessing map data associated with a surrounding environment of the vehicle; and
    based on the map data, the speed, and the time to position the second sensor, determining a capture location.

5. The method of claim 1, wherein the second sensor includes a different field of view than the first sensor.

6. The method of claim 1, wherein the second sensor includes a higher pixel density than the first sensor.

7. The method of claim 1, wherein the capture location is determined in three dimensional space.

8. The method of claim 1, wherein the active illumination device is configured with a field of view that corresponds to a field of view of the second sensor.

9. A vehicle comprising:
    vehicle controls for controlling the vehicle;
    a first sensor and a second sensor, wherein the second sensor is configured with an active illumination device;
    one or more processors;
    a memory storing instructions that are executable by the one or more processors to cause the one or more processors to:
        capture a first image with the first sensor, wherein the first image includes an object;
        based on an attempt to identify the object in the first image, determine a capture location of the object for obtaining a second image of the object by the second sensor, wherein the active illumination device is synchronized to illuminate when the second sensor captures the second image;
        direct the second sensor to capture the second image of the object at the capture location of the object, wherein the active illumination device illuminates a field of view corresponding to the capture location of the object;
        identify the object based on the second image; and
        control the vehicle based on identifying the object.

10. The vehicle of claim 9, wherein directing the second sensor to capture the second image comprises determining an orientation of the vehicle relative to the capture location.

11. The vehicle of claim 9, wherein directing the second sensor to capture the second image comprises:
    determining a speed associated with the vehicle;
    determining a time to position the second sensor from a first position to a second position, wherein the second position is associated with the capture location; and
    based on the speed and the time to position the second sensor, directing the second sensor to the second position to capture the second image.

12. The vehicle of claim 11, wherein the one or more processors:
    access map data associated with a surrounding environment of the vehicle; and
    based on the map data, the speed, and the time to position the second sensor, determine a capture location.

13. The vehicle of claim 9, wherein the second sensor includes a different field of view than the first sensor.

14. The vehicle of claim 9, wherein the second sensor includes a higher pixel density than the first sensor.

15. The vehicle of claim 9, wherein the capture location is determined in three dimensional space.

16. The vehicle of claim 9, wherein the active illumination device is configured with a field of view that corresponds to a field of view of the second sensor.

17. A computing system for controlling a vehicle comprising:
    one or more processors;
    one or more non-transitory computer-readable media that store instructions executable by the one or more processors to cause the one or more processor to perform operations, the operations comprising:
        capturing a first image with a first sensor, wherein the first image includes an object;
        based on an attempt to identify the object in the first image, determining a capture location of the object for obtaining a second image of the object by a second sensor, wherein the second sensor is configured with an active illumination device that is synchronized to illuminate when the second sensor captures the second image;
        directing the second sensor to capture the second image of the object at the capture location of the object, wherein the active illumination device illuminates a field of view corresponding to the capture location of the object;
        identifying the object based on the second image; and
        controlling the vehicle based on identifying the object.

18. The computing system of claim 17, wherein directing the second sensor to capture the second image comprises determining an orientation of the vehicle relative to the capture location.

19. The computing system of claim 18, wherein directing the second sensor to capture the second image comprises:
 determining a speed associated with the vehicle;
 determining a time to position the second sensor from a first position to a second position, wherein the second position is associated with the capture location; and
 based on the speed and the time to position the second sensor, directing the second sensor to the second position to capture the second image.

20. The computing system of claim 19, wherein the operations further comprise:
 accessing map data associated with a surrounding environment of the vehicle; and
 based on the map data, the speed, and the time to position the second sensor, determining a capture location.

* * * * *